US012808770B2

(12) United States Patent
Bai et al.

(10) Patent No.: US 12,808,770 B2
(45) Date of Patent: Nov. 24, 2026

(54) METHODS AND SYSTEMS FOR ASSESSING THE SUITABILITY OF A FLUOROCHROME PANEL FOR USE IN A FLOW CYTOMETRIC PROTOCOL

(71) Applicant: BECTON, DICKINSON AND COMPANY, Franklin Lakes, NJ (US)

(72) Inventors: Wenyu Bai, San Jose, CA (US); Peter Mage, San Jose, CA (US); Nikolay Samusik, Jacksonville, OR (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 527 days.

(21) Appl. No.: 18/226,555

(22) Filed: Jul. 26, 2023

(65) Prior Publication Data

US 2024/0133791 A1 Apr. 25, 2024

Related U.S. Application Data

(60) Provisional application No. 63/413,757, filed on Oct. 6, 2022.

(51) Int. Cl.
*G01N 15/1429* (2024.01)

(52) U.S. Cl.
CPC ................................ *G01N 15/1429* (2013.01)

(58) Field of Classification Search
CPC ........ G16C 20/64; G16C 20/62; G16C 20/30; G01N 2015/1006; G01N 15/1429; G01N 15/14; G01J 3/4406
See application file for complete search history.

(56) References Cited

U.S. PATENT DOCUMENTS 4,704,891 A 11/1987 Recktenwald et al.
4,777,133 A 10/1988 Picciolo et al.
(Continued)

FOREIGN PATENT DOCUMENTS

AU 2014228537 8/2015
AU 2018206722 8/2018
(Continued)

OTHER PUBLICATIONS

Bauer, et al. (eds.), Clinical Flow Cytometry: Principles and Applications, Williams & Wilkins (1993).
(Continued)

*Primary Examiner* — Lam S Nguyen
(74) *Attorney, Agent, or Firm* — Bret E. Field; BOZICEVIC, FIELD & FRANCIS LLP

(57) ABSTRACT

Methods of assessing the suitability of a fluorochrome panel for use in a flow cytometric protocol analyzing a biological sample are provided. Methods of interest include, with a processor, receiving an initial fluorochrome panel, a plurality of population identifiers each referring to a particle population, and an instrument identifier. Methods additionally include, creating a set of population-marker pairs, generating a set of separability metrics each predicting a measure of statistical distance between particle populations in flow cytometer data space, aggregating the set of separability metrics into a panel score, and evaluating the panel score. Systems and non-transitory computer readable storage media for assessing the suitability of a fluorochrome panel for use in a flow cytometric protocol analyzing a biological sample are also provided.

20 Claims, 8 Drawing Sheets

(56) References Cited

U.S. PATENT DOCUMENTS

| | | | | |
|---|---|---|---|---|
| 4,845,653 | A | 7/1989 | Conrad et al. | |
| 4,857,451 | A | 8/1989 | Schwartz et al. | |
| 5,093,234 | A | 3/1992 | Schwartz et al. | |
| 5,599,932 | A | 2/1997 | Bieniarz et al. | |
| 5,627,040 | A | 5/1997 | Bierre et al. | |
| 5,658,751 | A | 8/1997 | Yue et al. | |
| 5,739,000 | A | 4/1998 | Bierre et al. | |
| 5,784,162 | A | 7/1998 | Cabib et al. | |
| 5,795,727 | A | 8/1998 | Bierre et al. | |
| 5,962,238 | A | 10/1999 | Sizto et al. | |
| 6,014,904 | A | 1/2000 | Lock | |
| 6,897,954 | B2 | 5/2005 | Bishop et al. | |
| 6,944,338 | B2 | 9/2005 | Lock et al. | |
| 7,674,598 | B2 | 3/2010 | Paul et al. | |
| 7,932,503 | B2 | 4/2011 | Parks et al. | |
| 8,116,984 | B2 | 2/2012 | Davis et al. | |
| 8,214,323 | B2 | 7/2012 | Zigon | |
| 8,309,306 | B2 | 11/2012 | Nolan et al. | |
| 8,364,418 | B2 | 1/2013 | Davis et al. | |
| 8,380,541 | B1 | 2/2013 | Homes | |
| 8,538,774 | B2 | 9/2013 | Michelson et al. | |
| 8,731,844 | B2 | 5/2014 | Herzenberg et al. | |
| 8,779,387 | B2 * | 7/2014 | Rogers | G01N 15/1429 250/459.1 |
| 10,215,685 | B2 | 2/2019 | Zigon et al. | |
| 10,235,429 | B2 | 3/2019 | Meehan et al. | |
| 10,502,678 | B2 | 12/2019 | Kapinsky | |
| 10,876,953 | B2 | 12/2020 | Ren | |
| 12,347,525 | B2 | 7/2025 | Nakagawa | |
| 2004/0119974 | A1 | 6/2004 | Bishop et al. | |
| 2008/0240988 | A1 | 10/2008 | Wakamiya et al. | |
| 2009/0142231 | A1 | 6/2009 | Shibuya et al. | |
| 2010/0228491 | A1 | 9/2010 | Gutierrez | |
| 2010/0256943 | A1 | 10/2010 | Donnenberg et al. | |
| 2010/0302536 | A1 | 12/2010 | Ball et al. | |
| 2011/0204259 | A1 | 8/2011 | Rogers et al. | |
| 2011/0282870 | A1 | 11/2011 | Herzenberg et al. | |
| 2012/0245889 | A1 | 9/2012 | Zhu et al. | |
| 2013/0078621 | A1 | 3/2013 | Nolan et al. | |
| 2013/0322825 | A1 | 12/2013 | Sekino et al. | |
| 2014/0309782 | A1 | 10/2014 | Sharpe et al. | |
| 2015/0134315 | A1 | 5/2015 | Sarmiento | |
| 2015/0140577 | A1 | 5/2015 | Li et al. | |
| 2016/0025621 | A1 * | 1/2016 | Kapinsky | G01N 15/14 702/30 |
| 2016/0123980 | A1 | 5/2016 | Evans et al. | |
| 2018/0231452 | A1 * | 8/2018 | Ren | G01N 15/1425 |
| 2019/0383725 | A1 | 12/2019 | Petersen | |
| 2020/0132594 | A1 | 4/2020 | Kapinsky et al. | |
| 2021/0239592 | A1 | 8/2021 | Halpert | |
| 2021/0263019 | A1 | 8/2021 | Martin | |
| 2021/0349004 | A1 | 11/2021 | Halpert | |
| 2021/0404939 | A1 | 12/2021 | Hage et al. | |
| 2022/0082488 | A1 | 3/2022 | Jaimes et al. | |
| 2022/0082489 | A1 | 3/2022 | Jaimes | |
| 2022/0108774 | A1 * | 4/2022 | Seay | G01N 15/1429 |
| 2022/0381671 | A1 | 12/2022 | Nishimaki | |
| 2023/0243735 | A1 | 8/2023 | Mage | |
| 2024/0027447 | A1 | 1/2024 | Edinger | |
| 2024/0027457 | A1 | 1/2024 | Chang | |
| 2024/0037581 | A1 | 2/2024 | Kaga et al. | |
| 2024/0133791 | A1 | 4/2024 | Bai | |

FOREIGN PATENT DOCUMENTS

| | | | |
|---|---|---|---|
| CN | 108474728 | A | 8/2018 |
| CN | 110579435 | A | 12/2019 |
| CN | 111537426 | A | 8/2020 |
| EP | 1431745 | | 6/2004 |
| EP | 0774113 | | 9/2005 |
| EP | 1836557 | A | 9/2007 |
| EP | 2711713 | A | 4/2012 |
| EP | 2843418 | A | 3/2015 |
| EP | 2347352 | A | 11/2019 |
| EP | 2972213 | A | 5/2020 |
| EP | 4141419 | B1 | 2/2025 |
| FR | 2994740 | A1 | 3/2015 |
| JP | 2003083894 | A | 3/2003 |
| JP | 2004163312 | A | 6/2004 |
| JP | 2009109218 | A | 5/2009 |
| JP | 2010156679 | A | 7/2010 |
| JP | 2012052985 | A | 3/2012 |
| JP | 2016517000 | A | 6/2016 |
| KR | 20110058715 | | 6/2011 |
| WO | WO2013134491 | A1 | 9/2013 |
| WO | WO2014029743 | A1 | 2/2014 |
| WO | WO2014063247 | | 5/2014 |
| WO | WO2014144826 | | 9/2014 |
| WO | WO2014188170 | A1 | 11/2014 |
| WO | WO2019245709 | | 12/2019 |
| WO | WO2019245709 | A1 | 12/2019 |
| WO | WO2022019016 | A1 | 1/2022 |
| WO | WO2022049913 | A1 | 3/2022 |
| WO | WO2023235203 | A1 | 12/2023 |

OTHER PUBLICATIONS

Biosciences, B.D. "An Introduction to Compensation for Multicolor Assays on Digital Flow Cytometers." BDbiosciences.com (2009).

Biosciences, B.D. "Introduction to Flow Cytometry: A learning guide." Manual Pati 1 (2000).

Jaroszeski, et al. (eds.), Flow Cytometry Protocols, Methods in Molecular Biology No. 91, Humana Press (1997).

Lan Day, et al. (eds.), Clinical Flow Cytometry, Annals of the New York Academy of Sciences vol. 677 (1993).

Ormerod (ed.), Flow Cytometry: A Practical Approach, Oxford Univ. Press (1997).

Pawley (ed.), Handbook of Biological Confocal Microscopy, 2nd Edition, Plenum Press (1989).

Shapiro, Howard M. Practical flow cytometry, 4th ed. John Wiley & Sons, 2003.

BD Biosciences, "BD Horizon™ Guided Panel Solution (GPS) tool", https://igxorigin.bdbiosciences.com/en-eu/applications/research-applications/multicolor-flow-cytometry/product-selection-tools/horizon-gps-tool, Accessed Jan. 9, 2022, 4 pages.

Chromacyte, "Flow Cytometry Antibodies & Reagents—Antibody Search", www.chromocyte.com, Accessed on Jan. 9, 2022, 2 Pages.

Thermofisher Scientific, "Flow Cytometry Panel Builder", https://www.thermofisher.com/us/en/home/life-science/cell-analysis/flow-cytometry/antibodies-for-flow-cytometry/flow-cytometry-panel-builder.html, Accessed Jan. 10, 2022, 4 Pages.

FluoroFinder, "FluoroFinder Experiment Design Platform", https://fluorofinder.com, Accessed Jan. 9, 2022, 10 Pages.

Chattopadhyay, et al. "Immune monitoring for immuno-oncology applications", The Journal of Immunology, vol. 204, Issue 1, 2020, 5 Pages.

BioLegend, "Multicolor Panel Selector", https://www.biolegend.com/en-us/panel-selector, Accessed Jan. 10, 2022, 3 Pages.

Chattopadhyay, "The Colorful Future of Cell Analysis by Flow Cytometry", Discov Med. . Oct. 2004;4(23):255-62.

Nguyen, Richard, et al. "Quantifying spillover spreading for comparing instrument performance and aiding in multicolor panel design." Cytometry Part A 83.3 (2013): 306-315.

Pyne, Saumyadipta, et al. "Automated high-dimensional flow cytometric data analysis." Proceedings of the National Academy of Sciences 106.21 (2009): 8519-8524.

Isac, "Data File Standard for Flow Cytometry—Version 4.0", 2016, 69 Pages.

Thermo Fisher Scientific, "Flow Cytometry Panel Builder", www.thermofisher.com/us/en/home.html, Downloaded May 3, 2023, 3 pages.

Thermo Fisher Scientific, "Flow Cytometry Panel Builder", www.thermofisher.com/us/en/home.html, Downloaded May 3, 2023, 4 pages.

PanelBuilder, http://angularjs.org, Downloaded Oct. 28, 2021, 2429 Pages.

Flores-Montero, et al. "Fluorochrome choices for multi-color flow cytometry", J Immunol Methods. Dec. 2019:475:112618.

(56) References Cited

OTHER PUBLICATIONS

Ferrer-Font, et al. "Panel Design and Optimization for High-Dimensional Immunophenotyping Assays Using Spectral Flow Cytometry", Curr Protoc Cytom. Mar. 2020;92(1):e70.
Brummelman, et al. "Development, application and computational analysis of high-dimensional fluorescent antibody panels for single-cell flow cytometry", Nat Protoc. Jul. 2019;14(7):1946-1969.
Chattopadhyay, "Color Wheel: An Automated Tool for Instrument Setup and Panel Design in Polychromatic Flow Cytometry", NYU Langone Health, NYU School of Medicine, 2018, 34 pages.
International Search Report for International Application No. PCT/US2015/014681 dated Apr. 15, 2015, 7 pages.
International Search Report and Written Opinion mailed Oct. 20, 2016, received in PCT/US2016/042083, 8 pages.
Baumgarth, "A practical approach to multicolor flow cytometry for immunophenotyping", J Immunol Methods. Sep. 21, 2000 ;243(1-2):77-97.
Matthias, "Selectivity in multicomponent analysis", Analytica Chimica Acta, vol. 180, 1986, pp. 445-456.
Thermo Fisher Scientific—NI: "Spectral 1-15 Flow Cytometry Fundamentals", Jun. 22, 2019 (Jun. 22, 2019), XP055721454, Retrieved from the Internet: URL:https://www.thermofisher.com/nl/en/home/life-science/cell-analysis/flow-cytometry/flow-cytometry-learning-center/flow-cytometry-resource-library/flow-cytometry-methods/spectral-flow-cytometry-fundamentals.html [retrieved on Mar. 27, 2026].
Kalivas, "Assessing Spectral Orthogonality", Applied Spectroscopy Reviews, vol. 25, 1989, Issue 3-4.
Fontana, "Individual-level trait diversity predicts phytoplankton community properties better than species richness or evenness", The ISME Journal vol. 12, pp. 356-366, 2018.

* cited by examiner

121

METHODS AND SYSTEMS FOR ASSESSING THE SUITABILITY OF A FLUOROCHROME PANEL FOR USE IN A FLOW CYTOMETRIC PROTOCOL

CROSS-REFERENCE TO RELATED APPLICATIONS

This application claims priority to the filing date of U.S. Provisional Patent Application Ser. No. 63/413,757 filed on Oct. 6, 2022; the disclosure of which application is incorporated herein by reference.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. For example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of detectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

The parameters measured using a particle analyzer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules or fluorescent dye. Different cell types can be identified by their light scatter characteristics and fluorescence emissions resulting from labeling various cell proteins or other constituents with fluorescent dye-labeled antibodies or other fluorescent probes. Forward-scattered light, side-scattered light and fluorescent light is detected by photodetectors that are positioned within the particle analyzer.

Where flow cytometry protocols include the detection of fluorescent light, experimental design generally involves the identification of a fluorochrome panel, i.e., a collection of fluorochromes to be used together in a given flow cytometric workflow. The process of fluorochrome panel design is necessary because biological resolution (i.e., the ability to distinguish between different components of interest within or between particles of interest) is directly impacted both by the measurement variance of the "raw" flow cytometry data and by the mathematical process of spectral compensation or unmixing. Both of these factors depend strongly on the choice of fluorochromes in the panel. First, measurement variance (i.e., noise) in flow cytometry arises from a wide range of sources including constant baseline measurement noise in the cytometer's electronics, optical shot noise that varies linearly with signal intensity, and multiplicative measurement noise arising from random fluctuations in the cytometer's lasers and fluidics which varies quadratically with signal intensity. The measurement noise itself depends on the choice of fluorochromes. For example, brighter fluorochromes will induce more shot noise than dim fluorochromes, and dim fluorochromes will have a smaller signal magnitude compared to the constant "noise floor" of the instrument's optics and electronics. Second, raw measurement noise in "detector space" (having a number of dimensions equal to the number of detectors in the instrument) propagates to the final biological data in "compensated space" or "unmixed space" (having a number of dimensions equal to the number of fluorochromes in the sample) through the mathematical process of fluorescence compensation (in conventional cytometers) or spectral unmixing (in full-spectrum cytometers). Variance in "unmixed space" is important because it is the space in which the final biological analysis of interest (e.g., gating, clustering, sorting, marker quantitation, etc.) is performed. This mathematical mapping of noise into biological space depends strongly on the spectral signatures of the fluorochromes themselves.

Conventional flow cytometry, in which discrete photodetectors are dedicated to dye-specific fluorescence emission bands, places a hard limit on the number of fluorochromes that may be used simultaneously in a flow experiment: the number of fluorochromes may not exceed the number of fluorescence detection channels on the instrument. In contrast, full-spectrum flow cytometers use more detectors than fluorochromes by definition, and commercially available full-spectrum flow cytometers are available with over 180 fluorescence channels. Given the current photonic technology (laser source, optics, and detectors) and the availability of fluorochromes, flow cytometry typically works in the ultraviolet (300 nm) to the near infrared (850 nm) regime which represents a 'real estate' of only ~550 nm. Although the operating wavelength range can be stacked by using more lasers, it is often inevitable to use fluorochromes with overlapping emission spectra thus requiring compensation or spectral unmixing to recover the true median fluorochrome abundance. Spectrum overlapping adds additional noise to the detectors, thus increasing the spreads of the compensated/unmixed data and degrading the ability to differentiate populations. The phenomenon of increased spread due to spectrum overlapping is referred to as the spillover spreading. Therefore, the process of panel design, that is, strategically pairing biomarkers with appropriate fluorochromes, is critical to the success of a flow experiment, and it is becoming increasingly important as flow cytometry moves towards high-parameter space where there is a greater chance of spillover spreading.

SUMMARY

The present inventors have realized that a practical limit exists for the number of fluorochromes and biomarkers that may be used simultaneously in a flow cytometry experiment.

In spite of the commercial availability of nearly 100 distinct fluorochrome molecules for flow cytometry, panel sizes remain limited. This practical limit arises from the unavoidable spectral overlap and similarity of the fluorochromes used. Accordingly, methods and systems for assessing and selecting suitable fluorochrome panels are desirable. Embodiments of the present invention satisfy this desire.

Aspects of the invention include methods of assessing the suitability of a fluorochrome panel for use in a flow cytometric protocol analyzing a biological sample. Methods of interest include, with a processor, receiving an initial fluorochrome panel comprising a set of fluorochrome identifiers each referring to a fluorochrome in a set of fluorochromes, and a set of biological marker identifiers each associated with a fluorochrome identifier in the set of fluorochrome identifiers; a plurality of population identifiers each referring to a particle population; and an instrument identifier. In some instances, the processor also receives a gating strategy, and the initial fluorochrome panel is determined based on said gating strategy. In some cases, methods include receiving a randomly determined fluorochrome panel. Methods also include creating a set of population-marker pairs by associating each population identifier in the plurality of population identifiers with a biological marker identifier from the set of biological marker identifiers. A set of separability metrics each predicting a measure of statistical distance between particle populations in flow cytometer data space is then generated. Each measure of statistic distance is related to a detected signal intensity that would result from each fluorochrome associated with each population-marker pair being employed in a flow cytometric protocol using an instrument associated with the instrument identifier. Next, the separability metrics may be aggregated into a panel score which can then be evaluated to assess the suitability of the initial fluorochrome panel for use in the flow cytometric protocol.

In some cases, creating the set of population-marker pairs comprises creating a population-marker pair for an implicit particle population that is not referred to in the received plurality of population identifiers but is present in the biological sample. In additional cases, creating the set of population-marker pairs further comprises defining one or more quantitative pairs of biological marker identifiers for evaluating the quantitative expression of a particle population. Generating the set of separability metrics may, in embodiments, comprise predicting a statistical moment for each biological marker identifier in the set of biological marker identifiers based on the detected signal intensities. In such embodiments, predicting the statistical moment may include predicting a covariance matrix of the detected signal intensities, predicting a variance-covariance matrix of the detected signal intensities, or predicting a mean matrix of the detected signal intensities. In some cases, predicting the statistical moment for each biological marker identifier in the set of biological marker identifiers comprises incorporating the effects of a noise model (e.g., Gaussian noise model, Poisson noise model) in the detected signal intensities. Incorporating the effects of the noise model in the detected signal intensities, in some examples, comprises running a Monte Carlo simulation, and/or obtaining an analytical formula that relates the predicted statistical moments to the noise model (e.g., by incorporating the effects of the noise model in the detected signal intensities based on a spillover spreading matrix). In some instances, generating the set of separability metrics comprises stabilizing the variances of the detected signal intensities (e.g., via biexponential scaling or inverse hyperbolic function scaling). In certain versions, stabilizing the variances of the detected signal intensities comprises solving an optimization problem having an objective function being the similarities of the variances of different distributions of detected signal intensities. In select instances, stabilizing the variances of the detected signal intensities comprises determining an analytical relationship between the variance and mean of the detected signal intensities.

Aggregating the set of separability metrics into a panel score may include, for example, negating the value of the lowest separability score. In certain embodiments, methods include separately aggregating a set of separability metrics for each of the population-marker pairs and the quantitative pairs. In some such embodiments, determining the panel score comprises calculating a vector of the aggregated set of separability metrics for the population-marker pairs and the aggregated set of separability metrics for the quantitative pairs. Aggregating the set of separability metrics may include, for example, comparing each separability metric to a threshold value.

Methods of interest may also involve generating an optimized fluorochrome panel based on the assessment of the suitability of the initial fluorochrome panel for use in the flow cytometric protocol, e.g., by determining a fluorochrome panel having an optimized panel number. Generating the optimized fluorochrome panel may include, for example, adjusting (e.g., iteratively adjusting) the fluorochromes in the initial fluorochrome panel and assessing the suitability of the adjusted (e.g., iteratively adjusted) fluorochrome panel for use in the flow cytometric protocol.

Aspects of the invention additionally include systems, where systems of interest are configured to perform the subject methods (e.g., as described in brief above). The subject systems include a processor configured to receive an initial fluorochrome panel comprising a set of fluorochrome identifiers each referring to a fluorochrome in a set of fluorochromes, and a set of biological marker identifiers each associated with a fluorochrome identifier in the set of fluorochrome identifiers, a plurality of population identifiers each referring to a particle population, and an instrument identifier. The processor of the invention is configured to create a set of population-marker pairs by associating each population identifier in the plurality of population identifiers with a biological marker identifier from the set of biological marker identifiers, and generate a set of separability metrics each predicting a measure of statistical distance between particle populations in flow cytometer data space, where each measure of statistical distance is related to a detected signal intensity that would result from each fluorochrome associated with each population-marker pair being employed in a flow cytometric protocol using an instrument associated with the instrument identifier. In embodiments, processors also aggregate the set of separability metrics into a panel score, and evaluate said panel score to assess the suitability of the initial fluorochrome panel for use in the flow cytometric protocol. In some instances, the system is, or comprises, a flow cytometer. Systems of interest may further include a display configured to output the assessment of the initial fluorochrome panel and/or the optimized fluorochrome panel. Aspects of the invention also include non-transitory computer readable storage media having instructions stored thereon, which, when executed by a processor, result in the assessment of the suitability of a fluorochrome panel for use in a flow cytometric protocol analyzing a biological sample.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
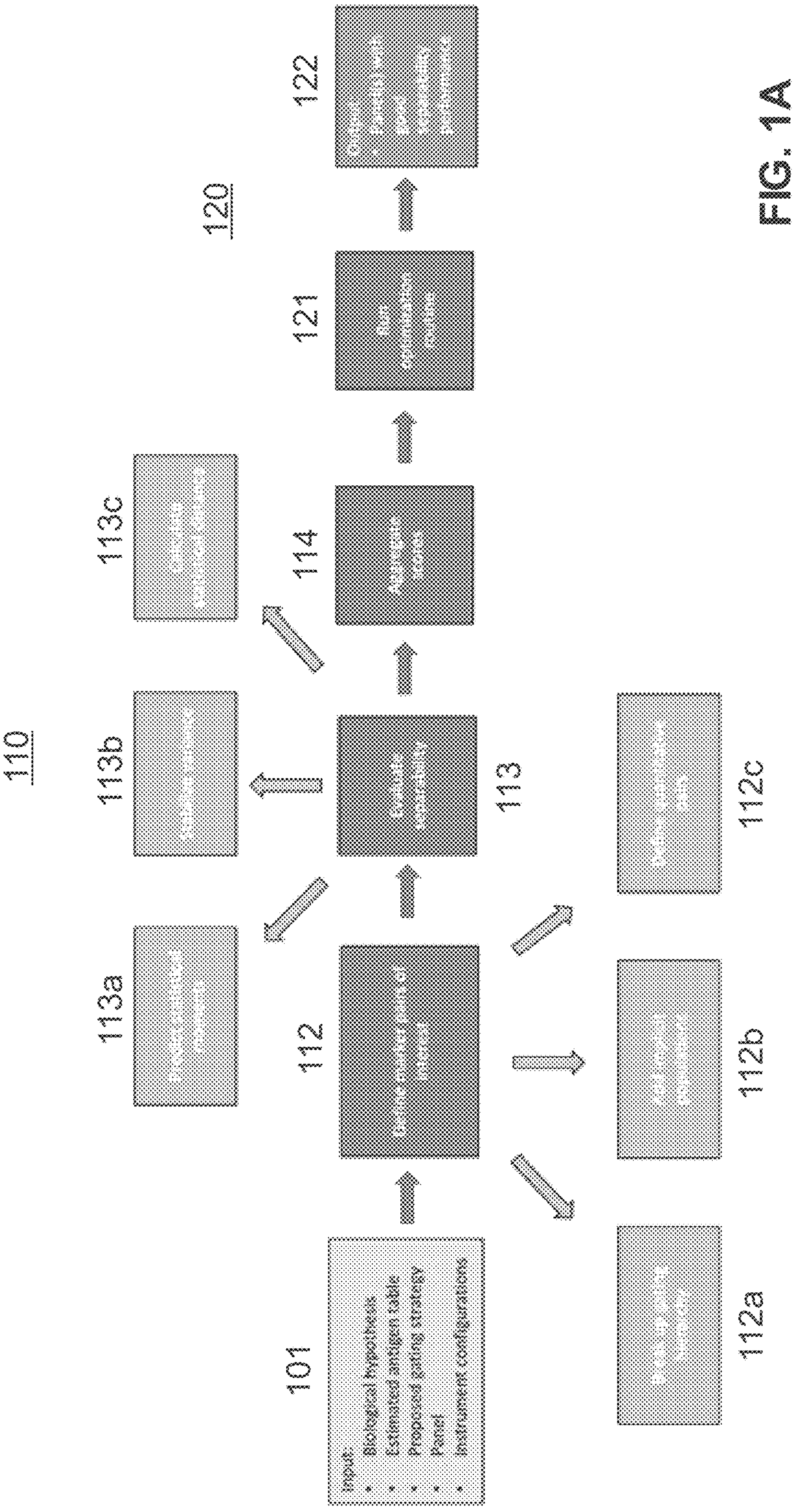
FIG. 1A-1B depict flowcharts for performing methods of assessing the suitability of a fluorochrome panel for use in a flow cytometric protocol analyzing a biological sample according to certain embodiments of the invention.

Methods of assessing the suitability of a fluorochrome panel for use in a flow cytometric protocol analyzing a biological sample are provided. Methods of interest include, with a processor, receiving an initial fluorochrome panel, a plurality of population identifiers each referring to a particle population, and an instrument identifier. Methods additionally include, creating a set of population-marker pairs, generating a set of separability metrics each predicting a measure of statistical distance between particle populations in flow cytometer data space, aggregating the set of separability metrics into a panel score, and evaluating the panel score. Systems and non-transitory computer readable storage media for assessing the suitability of a fluorochrome panel for use in a flow cytometric protocol analyzing a biological sample are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Assessing a Fluorochrome Panel

As discussed above, aspects of the invention include assessing the suitability of a fluorochrome panel for use in a flow cytometric protocol analyzing a biological sample. As discussed herein, a "fluorochrome panel" refers to a set of different fluorescent molecular substances (i.e., dyes) that may be used to identify particles in a sample or particular moieties or components associated therewith. The "fluorochrome panel" discussed herein may also refer to a set of identifiers (e.g., digital identifiers) that uniquely refer to and are associated with particular fluorescent molecular substances. Such identifiers may be referred to herein as "fluorochrome identifiers". Distinct fluorochromes within the fluorochrome panel may differ with respect to properties such as absorption spectra, extinction coefficients, emission spectra, and quantum efficiency (i.e., the number of photons emitted for every photon absorbed), or combinations thereof. As such, different or distinct fluorochromes may differ from each other in terms of chemical composition and/or in terms of one or more properties of the dyes. For example, a given pair of fluorochromes may be considered distinct if they differ from each other in terms of excitation and/or emission maximum, where the magnitude of such difference is, in some instances, 5 nm or more, such 10 nm or more, including 15 nm or more, wherein in some instances the magnitude of the difference ranges from 5 to 400 nm, such as 10 to 200 nm, including 15 to 100 nm, such as 25 to 50 nm.

Assessing the suitability of a fluorochrome panel for use in a flow cytometric protocol refers to predicting the quality of flow cytometer data that would be produced were the fluorochrome panel to be employed in a flow cytometer. In other words, a fluorochrome panel may be described as "suitable for use" in a flow cytometric protocol when the fluorochrome panel produces intelligible flow cytometer data that reliably provides insight on the characteristics of interest in the sample under investigation. In some embodiments, a fluorochrome panel is suitable for use in a flow cytometric protocol when the panel provides increased biological resolution. "Biological resolution" refers to the ability to distinguish between different entities (e.g., molecules, antigens, moieties, epitopes, or the like) of interest in a biological specimen. In some cases, fluorochrome panels identified herein produce maximum biological resolution in spite of measurement variance as well as variance in flow cytometer data space (e.g., flow cytometer data that has undergone fluorescence compensation or spectral unmixing). The "maximum" biological resolution is, in certain versions, assessed relative to the biological resolution that would be achieved using one or more other sets of fluorochromes that are different from (i.e., contain one or more different fluorochromes relative to) optimal fluorochrome panels as determined herein.

Methods of the invention include receiving an initial fluorochrome panel. The initial fluorochrome panel may be determined in any convenient manner. In some embodiments, the initial fluorochrome panel is randomly determined (e.g., via the processor). In certain cases, methods include receiving a gating strategy, and determining the initial fluorochrome panel based on the gating strategy. In other words, the processor may select an initial fluorochrome panel based on fluorochromes that are typically used with particles having certain phenotypic characteristics that are of interest in the gating strategy. The fluorochromes that are available for use in a given fluorochrome panel may vary, as desired. In some embodiments, a skilled artisan practicing the method can restrict the universe of fluorochromes from which the initial fluorochrome panel is formed to, for example, those that are easily available to the artisan.

A fluorochrome panel of the invention may also include a set of biological marker identifiers each associated with a fluorochrome identifier in the set of fluorochrome identifiers. As discussed herein, a "biological marker" may refer to any distinguishable feature of a biological sample (e.g., organ, tissue, cell, macromolecule, etc.) that may be associated with a fluorochrome (e.g., as part of an antibody-dye conjugate) for analysis. In some embodiments, biological markers include one or more cell-surface proteins. In certain instances, biological markers include clusters of differentiation (CD) molecules. A "biological marker identifier" refers to a set of identifiers (e.g., digital identifiers) that uniquely refer to and are associated with a particular biological marker in data space. An exemplary fluorochrome panel having fluorochrome identifiers and associated biological marker identifiers is shown in Table 5, presented below in the Experimental section. In certain cases, a skilled artisan practicing the method can restrict the universe of fluorochromes from which the initial fluorochrome panel is formed to, for example, the set of fluorochromes for which antibody conjugations are available for all the markers of interest.

Methods of the invention may additionally include receiving a plurality of population identifiers each referring to a particle population. A "particle population" referred to herein in its conventional sense to describe a grouping of particles having the same characteristics, or sufficiently similar characteristics for the purpose of the particular protocol. In some instances, a particle population may be described in terms of positivity or negativity with respect to one or more biological markers, such as those described above. In other words, a "population", or "subpopulation" of analytes, such as cells or other particles, generally refers to a group of analytes that possess properties (for example, optical, impedance, or temporal properties) with respect to one or more measured fluorescent parameters such that measured parameter data form a cluster in the data space. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured fluorescent parameters (i.e., fluorochromes), which corresponds to populations that differ in only a subset of the measured parameters or features extracted from the measurements of the sample.

In some embodiments, methods also include receiving a gating strategy, where the gating strategy provides rules for how clusters of flow cytometer data (e.g., populations) having certain characteristics will be distinguished from one another. In certain instances, the gating strategy comprises a gating hierarchy. A gating hierarchy as described herein defines the criteria by which fluorescent flow cytometer data is grouped into a particular population. In some embodiments, the hierarchy establishes how data points that are positive or negative for the same parameters (e.g., biological markers) are grouped together. In some versions, the gating hierarchy is a sequence of gating steps to identify populations of interest in a series of one-dimensional or two-dimensional histogram plots. For example, a partial gating hierarchy for clustering T cells by determining the positivity or negativity of the cells with respect to the presence of CD4 and CD8 is shown below:

$CD4^+$ and $CD8^-$→CD4 T Cell
$CD4^-$ and $CD8^+$→CD8 T Cell
$CD4^+$ and $CD8^+$→Double Positive T Cell
$CD4^-$ and $CD8^-$→Double Negative T Cell As shown above, a cell that is positive for CD4 but negative for CD8 is a "CD4 T Cell", while a cell that is positive for both markers is a "Double Positive T Cell", and so forth.

Methods of the invention include also receiving an instrument identifier. By "instrument identifier" it is meant information or data that refers to a particular instrument (e.g., particle analyzer, flow cytometer). In certain cases, the instrument identified via the instrument identifier is a flow cytometer. Any convenient flow cytometer configured to analyze fluorescent particle-modulated light may be employed. In certain instances, flow cytometers of interest include those produced by BD Biosciences. Exemplary flow cytometers include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter, BD FACSDiscover™ S8 Cell Sorter, or the like.

In some instances, receiving an instrument identifier permits instrument-specific assessment of a fluorochrome panel for use in a flow cytometric protocol. For example, the differences with respect to the number and arrangement of lasers and detection channels among separate instruments may result in different spectral signatures associated with each instrument. A "spectral signature" refers to the characteristics of an individual fluorochrome's fluorescent spectrum represented as one or more numerical values. Accordingly, embodiments of the subject methods perform an analysis that is specific to the particular instrument (or class/type of instrument) in which the fluorochromes in the assessed fluorochrome panel would hypothetically be employed. Due to differences between instruments, it is possible that the same fluorochrome panel may be more or less associated with variance in flow cytometer data if the fluorochromes were applied on two different types of machine (e.g., flow cytometer). The subject methods may allow a fluorochrome panel to be assessed in an instrument-specific context, thereby permitting a one of skill in the art practicing the subject methods to more reliably gain insight into the quality of flow cytometer data if fluorochromes in a given panel were used in a particular instrument.

Methods of the invention additionally include creating a set of population-marker pairs by associating each population identifier in the plurality of population identifiers with a biological marker identifier from the set of biological marker identifiers. In other words, markers that may be used to distinguish one population from another population are identified and associated with their respective populations. Where the methods include receiving a gating strategy, creating a set of population-marker pairs may involve breaking up said gating strategy. For example, if the objective of a flow experiment is to phenotype the subsets of CD8+ and CD4+ T cells and study the quantitative expression of CD27 and CD28 for those subsets, the biological hypothesis can be stated as the sample composed of CD8+ native T cells (CD8N), CD8+ central memory T cells (CD8CM), CD8+ effector memory T cells (CD8EM), CD8+ effector cells (CD8Eff), the counterparts for CD4+ T cell subsets (CD4N, CD4CM, CD4EM, CD4Eff), and regulatory T cell (Treg). A possible gating strategy is to first gate out CD3+ populations based on which the CD8+ and CD4+ populations can be gated, respectively. Among CD8+ or CD4+ cells, the different subsets can be differentiated by examining their expression patterns for CCR7 and CD45RA. Additionally, from CD4+ cell, Treg can be found in the CD25+ and CD127-populations. Therefore, in this example, the relevant marker pairs used for gating are {CD3}, {CD8, CD4}, {CCR7, CD45RA}, and {CD25, CD127}.

In some embodiments, methods include creating a population-marker pair for an implicit particle population that is not referred to in the received plurality of population identifiers but is present in the biological sample. In other words, populations that are not explicitly of interest to the experimental design but are nonetheless part of the biological sample are assigned to population marker pairs (e.g., in the manner described above). For example, some populations such as CD3− cells (non-T) or CD8−CD4− cells (double negative cells, T-dn) are not explicitly defined in a hypothesis (such as the one discussed above) which, however, can be present in the sample and affect how well the explicitly defined cells can be gated. Embodiments of the invention consequently include adding these implicit populations when formulating the population-marker pairs.

Creating the set of population-marker pairs may, in some instances, further include defining one or more quantitative pairs of biological marker identifiers for evaluating the quantitative expression of a particle population. In other words, methods of the invention may further include categorizing the population-marker pairs into gating pairs and quantitative pairs depending on their purpose in the gating strategy. Gating pairs refer to the pairs used to gate out/classify populations while, quantitative pairs (e.g., {CD27, CD28}) are mainly used to study the quantitative expression level of a gated population. Where it is desirable to measure quantitative expression these markers, it is advantageous to be able to separate populations of flow cytometer data having different profiles of these quantitative markers. Accordingly, versions of the invention include considering population-marker pairs constructed with respect to quantitative markers along with the explicitly defined populations described above (i.e., those that are part of the biological hypothesis and/or gating strategy). Similar to the implicit gating populations defined above, implicit quantitative populations can also be defined which, together with the corresponding explicit populations, constitute a full set of four expression patterns for the quantitative pairs, i.e. (+, +), (+, −), (−, +), (−, −), where "+" and "−" are qualitative notations of abundance indicating positive and negative populations, respectively and (+, −), e.g., means that the first marker is positive and the second negative. Therefore, the objective of having a narrow distribution for quantitative markers can be translated to making the four explicit and implicit quantitative populations separated with each other, thus making the logic consistent with how gating pairs are evaluated. For example, the expression pattern of {CD27, CD28} for CD8N is (+, ++) based on which three additional implicit populations are made up which include CD8N*CD27*CD28*q2, CD8N*CD27*CD28*q3, and CD8N*CD27*CD28*q4, where the notation is structured as {explicit cell population}*{first marker}*{second marker}*{quadrant number} and the quadrant number indicates the relative abundance of two markers, specifically, q1 means (+, ++), q2 (−, ++), q3 (−, −), and q4 (+, −) The expression patterns for these implicit populations are thus (−, ++), (−, −), and (+, −). A good panel should have these four populations separated with each other to ensure a confident quantitative analysis for {CD27, CD28} of CD8N.

Aspects of the invention also include generating a set of separability metrics each predicting a measure of statistical distance between particle populations in flow cytometer data space. The "measure of statistical distance" described herein is related to a signal intensity that would result from each fluorochrome associated with each population-marker pair being employed in a flow cytometric protocol using an instrument associated with the instrument identifier. Such results in a table of separability scores for all the pairs defined in the gating hierarchy. Any distance measure that quantifies the separability between populations may be employed. For example, the distance of two univariate distributions can be defined as the difference of the mean values normalized by the square root of the summation of the variances. For two bivariate distributions, methods may include projecting the bivariate distributions to the direction where two distributions are most separated and then to evaluate the distance between the projected distributions by taking the difference of the mean values normalized by the square root of the summation of the variances. By "predicting" the measure of statistical distance, it is meant estimating what the measure of statistical distance would be if the fluorochrome panel being assessed were to be employed in a flow cytometric protocol. Accordingly, in some cases, the signal intensities associated with the measure of statistical are estimated values (e.g., simulated values). In certain cases, generating the set of separability metrics each predicting a measure of statistical distance between particle populations in flow cytometer data space comprises calculating an earth-mover distance (EMD) of the distributions.

In some embodiments, generating the set of separability metrics comprises predicting a statistical moment for each biological marker identifier in the set of biological marker identifiers based on the detected signal intensities. "Statistical moments" are referred to herein in their conventional sense to refer to quantitative measures related to the shape of a function's graph. As is understood in the art, the first moment is the mean, the second is the variance, the third is skewness, and the fourth is kurtosis. In some instances, predicting a statistical moment for each biological marker identifier in the set of biological marker identifiers based on the detected signal intensities comprises calculating a matrix. In some such instances, predicting the statistical moment comprises predicting a covariance matrix of the detected signal intensities. In additional instances, predicting the statistical moment comprises predicting a variance-covariance matrix of the detected signal intensities. In still other instances, predicting the statistical moment comprises predicting a mean matrix of the detected signal intensities.

Protocols for predicting the statistical moments may vary. In some embodiments, predicting the statistical moments includes running a simulation. Any suitable simulation protocol may be employed. In certain instances, the simulation is a Monte Carlo simulation. Monte Carlo simulations are described in, e.g., Mooney, C. Z. (1997). *Monte carlo simulation*, incorporated by reference herein in its entirety. As is understood in the art, Monte Carlo simulations employ repeated random sampling to obtain numerical results. Such simulations may be employed to generate a simulated dataset of signal intensities that one could expect on a given instrument (i.e., associated with the instrument identifier). The statistical moments may subsequently be calculated from the simulated dataset. In certain cases, running the simulation involves parallel computing. In such cases, methods of the invention may employ a plurality of processors in conjunction to carry out the simulation. The number of processors in the plurality of processors may vary. For example, the simulation may be carried out by 2 or more processors, 3 or more processors, 4 or more processors, 5 or more processors, 6 or more processors, 7 or more processors, 8 or more processors, 9 or more processors, and including or more processors.

In certain versions, methods of the invention involve directly calculating the propagation of relevant statistical moments in the forward (i.e., from fluorophore to detector) and/or backward (i.e., from detector to fluorophore) modes. Specifically, in the forward mode, the distribution of fluorochrome abundance, instrument system noise, photon statistical noise, and all other relevant information are used in the noise model to predict the median and standard deviation of signal in each detector. While in the backward mode, the noise model is evaluated in a reversed order, i.e., the median and spread of fluorochrome abundance are predicted using signal distribution in each detector and all other relevant information. In some embodiments, propagation of relevant statistical moments is calculated in the forward mode. In other embodiments, propagation of relevant statistical moments is calculated in the backward mode. In still other embodiments, propagation of relevant statistical moments is calculated in the forward and backward modes.

In embodiments, predicting the statistical moment for each biological marker identifier in the set of biological marker identifiers comprises incorporating the effects of a noise model in the (predicted) detected signal intensities. For example, where predicting the statistical moments involves a simulation, methods of interest include incorporating an appropriate noise model into the simulation to capture the spread introduced from different sources. In some cases, the noise model is a Gaussian noise model. As is understood in the art, Gaussian noise is signal noise characterized by a probability density function equal to that of a Gaussian distribution. In embodiments, the Gaussian noise model may involve the probability function p of a Gaussian random variable z, as follows:

$$p_G(z) = \frac{1}{\sigma\sqrt{2\pi}} e^{-\frac{(z-\mu)^2}{2\sigma^2}}$$

where z represents the grey level, μ represents the mean grey value, and σ represents its standard deviation. In other embodiments, the noise model is a Poisson noise model. Poisson noise, sometimes referred to as "shot noise", describes fluctuations in numbers of photons detected. Such photo-current fluctuations scale as the square-root of the average intensity, as follows:

$$(\Delta I)^2 \overset{def}{=} \left\langle (I - \langle I \rangle)^2 \right\rangle \propto I$$

In some embodiments, methods include incorporating one noise model (i.e., Gaussian noise or Poisson noise). In other embodiments, methods include incorporating a plurality of noise models (e.g., Gaussian noise and Poisson noise).

In certain cases, incorporating the effects of the noise model in the detected signal intensities comprises obtaining an analytical formula that relates the moments of interest to the parameters of the noise model. Put another way, error associated with spillover can be incorporated to more realistically model the effects of noise caused by multiple fluorochromes being employed at once in a single flow cytometric protocol. For example, after the propagation of the statistical moments is calculated in the forward and backward directions (e.g., as described above), an analytical model showing the relationship between the noise and moments may be obtained. In certain cases, methods include using characteristic noise tensors (i.e., describing a multilinear relationship between sets of algebraic objects related to a vector space) to predict the spread of a certain marker. For example, in some instances, incorporating the effects of the noise model in the detected signal intensities based on a spillover spreading matrix (SSM). Spillover is a phenomenon in which particle-modulated light indicative of a particular fluorochrome is received by one or more detectors that are not configured to measure that parameter. "Spillover spreading", on the other hand, refers to the error contributed to the fluorescent flow cytometer data by spillover. In some instances, spillover spreading noise is constructive, which results in signal intensities that are higher than would otherwise be observed, while in other instances the noise is destructive, resulting in lower intensities. In certain embodiments, the spillover spreading matrix demonstrates how the detection of a particular fluorochrome by its corresponding detector is impacted by spillover from other fluorochromes. Spillover spreading matrices as well as methods for their calculation are described in U.S. Patent Application Publication No. 2021/0239592 and 2021/0349004, as well as Nguyen et al. *Cytometry Part A,* 83(3), 306-315; the disclosures of which are herein incorporated in their entirety.

In some embodiments, the spillover spreading matrix is calculated by means of the AutoSpread algorithm. The AutoSpread algorithm was created by Becton Dickinson and is described U.S. Patent Application Publication No. 2021/0349004, and is configured to create a spillover spreading matrix (e.g., as described above) without requiring a distinction between populations of flow cytometer that are positive and negative with respect to a given fluorochrome. AutoSpread characterizes the spread contributed to the detected signal of a first fluorochrome by the inclusion of a second fluorochrome in the same flow cytometry panel. AutoSpread produces one coefficient for each interaction between a fluorescent light detector and a fluorochrome, and arranges the coefficients into a matrix akin to the spillover spreading matrix described above. In embodiments, calculating a spillover spreading coefficient includes assuming that the intensity of fluorescent light collected by the fluorescent light detector for the negative population of flow cytometer data is zero, and the corresponding standard deviation is an unknown quantity. In some embodiments, the spillover spreading coefficient is calculated as follows:

$$SS = \frac{\sqrt{\sigma^2 - \sigma_0^2}}{\sqrt{d}}$$

As shown in Equation 2, SS is the spillover spreading coefficient, $\sigma^2$ is the standard deviation of the positive population of fluorescent flow cytometer data, $$\sigma_0^2$$

is an estimate of the standard deviation of the negative population of fluorescent flow cytometer data, and d is the intensity of light collected by a fluorescent light detector. In some embodiments, in order to obtain an estimate of the standard deviation of the negative population of fluorescent flow cytometer data $$(\sigma_0^2)$$

when the intensity of fluorescent light collected by the fluorescent light detector for the negative population of flow cytometer data is assumed to be zero, the spillover spreading coefficient is calculated following a sequence of linear regressions. Fluorescent flow cytometer data is first sorted into quantiles according to intensity values that are detected by the fluorescent light detector. The number of quantiles is by default 256, but is adjusted downwards to as few as 8 to ensure that each quantile has a sufficient number of data points to allow for reliable estimation of standard deviations. Next, the robust standard deviation of the light emitted from the fluorochrome is regressed against the square root of the median intensity of light detected for each quantile. The y-intercept of the ordinary least squares fit is taken as the estimate of the standard deviation in the negative population of flow cytometer data when the intensity of light detected for the negative population is assumed to be zero. The estimate of the standard deviation of light emitted from the fluorochrome is used to obtain new zero-adjusted standard deviations. The zero-adjusted standard deviation for the fluorochrome is regressed against the square root of the median fluorescence of each quantile detected by the fluorescent light detector. The slope of the ordinary least squares fit is taken as the spillover spreading coefficient.

In select versions, generating the set of separability metrics comprises stabilizing the variances of the detected signal intensities. Compensated or unmixed flow data typically has a large dynamic range which requires proper scaling before calculating the statistical distance. Examples include biexponential scaling or arcsinh (inverse hyperbolic function) scaling. The parameters used in these scaling methods can be determined by an automatic process which can be either data-driven or model-driven. The data-driven approach is essentially solving an optimization problem where the objective function is the similarities of the variances of different distributions. The model-driven approach bypasses the need of simulated fluorescence dataset but seeks to find an analytical relationship between the variance and the mean of the compensated data based on which a variance-stabilization transformation can be determined.

After the set of separability metrics generated, the result is a table of separability scores for all the pairs defined in the gating hierarchy. An example of such a table is Table 9, shown below in the Experimental section. Methods of the invention additionally include aggregating the set of separability metrics into a panel score. As discussed herein, the "panel score" is a metric that provides a measure of the suitability of a given fluorochrome panel for use in a particular flow cytometric protocol performed using a certain instrument that is formulated using the separability metrics. An aggregation procedure is needed to aggregate the table of separability scores into a panel score. In some embodiments, the panel score is a scalar (e.g., in embodiments involving single objective optimization). In other cases, the panel score is a vector (e.g., in embodiments involving multiobjective optimization). In certain cases, aggregating the set of separability metrics into a panel score comprises negating the value of the lowest separability score. In some such cases, the negated value may be taken as the panel score. In some instances, methods include using the number of pairs whose score is below a certain threshold as an objective function. In some instances, determining the panel score comprises calculating a vector of the aggregated set of separability metrics for the population-marker pairs and the aggregated set of separability metrics for the quantitative pairs. In some such instances, methods include separating the quantitative and classification markers, using a different aggregating strategy for each, and using a vector of the two elements as the panel score.

After a panel score is defined, it can be used as an objective function in the routine of combinatorial optimization. As such, in embodiments, methods include optimizing the fluorochrome panel based on the assessment of the suitability of the fluorochrome panel for use in generating the flow cytometer data, i.e., such that the fluorochrome panel is suitable for use in a flow cytometric protocol. In some embodiments, optimizing the fluorochrome panel comprises the use of a panel optimization algorithm. In some cases, the panel optimization algorithms is a constrained optimization algorithm. "Constrained optimization" is referred to herein in its conventional sense to describe a process of optimizing variables in the presence of constraints on those variables. Any suitable constrained optimization method may be employed. Examples of constrained optimization techniques that may be employed include, but are not limited to, local search, local repair, backtracking, and constraint propagation, random-restart hill climbing, and Tabu search. These may, in certain cases, be combined with minimization techniques such as simulated annealing and genetic (evolutionary) algorithms. In some cases, the fluorochrome panels described herein may be optimized in conjunction with the optimization protocols described in U.S. Provisional Patent Application No. 63/305,010 filed on Jan. 31, 2022, the disclosure of which is herein incorporated by reference herein. In embodiments, the variable that is optimized is the panel score. For problems with small search space, techniques that smartly traverse the search space can be used. Examples include, but are not limited to, dynamic programming and depth- or breath-first search. For problems with the search space too large to be traversed, the techniques of heuristic search can be used, for instance, the greedy algorithm, the genetic algorithm, and the algorithm introduced in U.S. Provisional Patent Application No. 63/305,010 filed on Jan. 31, 2022.

In certain cases, optimizing the fluorochrome panel comprises adjusting the fluorochromes in the fluorochrome panel and assessing the suitability of the adjusted fluorochrome panel for use in generating flow cytometer data. By "adjusting" the fluorochromes in the fluorochrome panel, it is meant switching out a fluorochrome—or a fluorochrome identifier associated therewith—for a different fluorochrome. One or more fluorochromes in the panel may be adjusted at any given time. In some instances, methods include switching out a single fluorochrome in the panel at a given time. In certain cases, optimizing the fluorochrome panel includes maintaining a fluorochrome panel having a constant size. In other words, the number of fluorochromes in the obtained fluorochrome panel does not change even as one or more fluorochromes are adjusted. For example, an assessed fluorochrome panel having N fluorochromes will continue to have N fluorochromes following adjustment. In certain instances, a fluorochrome in the fluorochrome panel is not swapped out for a fluorochrome that is already within the fluorochrome panel. After the adjusted fluorochrome panel is generated, methods of interest additionally include assessing the adjusted fluorochrome panel (e.g., as described above). Methods of interest further involve comparing the assessment of the first fluorochrome panel with the assessment of the adjusted fluorochrome panel. For example, methods may include determining which of the first and adjusted fluorochrome panels result in optimized separability metrics by proxy of the panel score.

In certain cases, methods include iteratively adjusting the fluorochrome panel and assessing the suitability of each iteratively adjusted fluorochrome panel. In embodiments, whichever of the first and adjusted fluorochrome panels that has been assessed to have a superior panel score may serve as the seed for the next part of the iterative process. By "seed" it is meant a fluorochrome panel that has been determined in one iteration of the method to be associated with a superior panel score in comparison to one or more slightly modified fluorochrome panels. In some embodiments, the iterative process repeats itself until a condition has been met. Any suitable condition may be used to terminate the iterative process. In some instances, the iterative process is terminated when a certain run-time has elapsed. In other instances, the iterative process is terminated when the assessments produced for each iteratively adjusted fluorochrome panel converges. Put another way, the iterative process is terminated when only minor panel score differences are observed between subsequent fluorochrome panels.

In some embodiments, methods also include producing a visualization of the assessed suitability of the fluorochrome panel for use in generating the flow cytometer data. Any suitable visualization may be employed. In some embodiments, the visualization includes a plot of flow cytometer data that is simulated based on a given fluorochrome panel. Put another way, the visualization would include exemplary flow cytometer data that would be produced if a sample were run on a particular instrument with a particular fluorochrome panel.

FIG. 1A presents a flowchart depicting an embodiment of the subject methods. In step 101, the biological hypothesis, an antigen table (i.e., list of biological markers), a gating strategy, an initial fluorochrome panel, and an instrument identifier (i.e., instrument configuration) are received. After the initial fluorochrome panel is received, the method includes assessing said fluorochrome panel (steps 110) by defining marker pairs of interest in step 112, evaluating separability in step 113, and aggregating the separability metrics into a panel score in step 114. In the embodiment of FIG. 1A, defining the markers of interest (step 112) includes breaking up the gating hierarchy in step 112*a*, adding implicit populations in step 112*b*, and defining quantitative pairs in step 112*c*. Evaluating the separability of the populations in step 113 also includes predicting statistical moments in step 113*a*, stabilizing variance in step 113*b*, and calculating the statistical distance 113*c*. After the panel score is produced in step 114, an optimized fluorochrome panel may be obtained (steps 120) by running an optimization routine (step 121) to create a panel with good separability performance that is output in step 122.

Figure 1B:
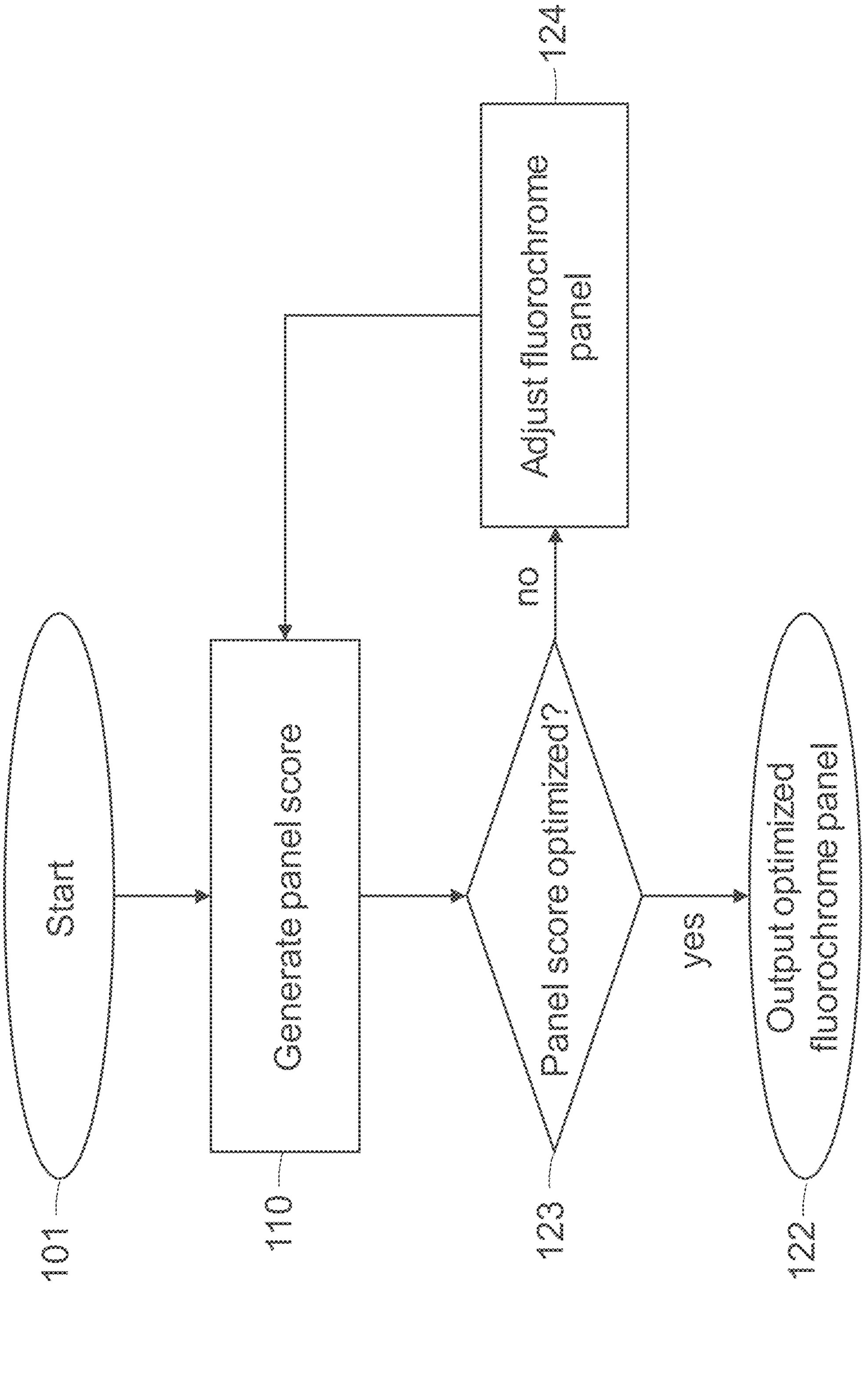

FIG. 1B presents an alternative depiction of the subject methods. The method begins by receiving an initial fluorochrome panel at step 101. Next, a panel score is generated (steps 110 described above with respect to FIG. 1A). In the panel optimization routine 121, it is determined whether the panel score generated in step 110 is optimized in step 123. A determination of whether or not the panel is optimized may be based on criteria provided by a user (e.g., threshold). If it is optimized, said optimized panel score is output to the user. If it is not optimized, the fluorochrome panel is adjusted. The adjusted fluorochrome panel is then provided to the panel score generation process 110. This process may be repeated until an optimized fluorochrome is determined.

The subject fluorochrome panels may include any suitable set of fluorochromes. Fluorochromes of interest according to certain embodiments have excitation maxima that range from 100 nm to 800 nm, such as from 150 nm to 750 nm, such as from 200 nm to 700 nm, such as from 250 nm to 650 nm, such as from 300 nm to 600 nm and including from 400 nm to 500 nm. Fluorochromes of interest according to certain embodiments have emission maxima that range from 400 nm to 1000 nm, such as from 450 nm to 950 nm, such as from 500 nm to 900 nm, such as from 550 nm to 850 nm and including from 600 nm to 800 nm. In certain instances, the fluorochrome is a light emitting dye such as a fluorescent dye having a peak emission wavelength of 200 nm or more, such as 250 nm or more, such as 300 nm or more, such as 350 nm or more, such as 400 nm or more, such as 450 nm or more, such as 500 nm or more, such as 550 nm or more, such as 600 nm or more, such as 650 nm or more, such as 700 nm or more, such as 750 nm or more, such as 800 nm or more, such as 850 nm or more, such as 900 nm or more, such as 950 nm or more, such as 1000 nm or more and including 1050 nm or more. For example, the fluorochrome may be a fluorescent dye having a peak emission wavelength that ranges from 200 nm to 1200 nm, such as from 300 nm to 1100 nm, such as from 400 nm to 1000 nm, such as from 500 nm to 900 nm and including a fluorescent dye having a peak emission wavelength of from 600 nm to 800 nm.

Fluorochromes of interest may include, but are not limited to, a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof. In certain embodiments, conjugates may include two or more dyes, such as two or more dyes selected from a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof.

In certain embodiments, fluorochromes of interest may include but are not limited to fluorescein isothiocyanate (FITC), a phycoerythrin (PE) dye, a peridinin chlorophyll protein-cyanine dye (e.g., PerCP-Cy5.5), a phycoerythrin-cyanine (PE-Cy) dye (PE-Cy7), an allophycocyanin (APC) dye (e.g., APC-R700), an allophycocyanin-cyanine dye (e.g., APC-Cy7), a coumarin dye (e.g., V450 or V500). In certain instances, fluorochromes may include one or more of 1,4-bis-(o-methylstyryl)-benzene (bis-MSB 1,4-bis[2-(2-methylphenyl)ethenyl]-benzene), a C510 dye, a C6 dye, nile red dye, a T614 dye (e.g., N-[7-(methanesulfonamido)-4-oxo-6-phenoxychromen-3-yl]formamide), LDS 821 dye ((2-(6-(p-dimethylaminophenyl)-2,4-neopentylene-1,3,5-hexatrienyl)-3-ethylbenzothiazolium perchlorate), an mFluor dye (e.g., an mFluor Red dye such as mFluor 780NS).

Fluorochromes of interest may include, but are not limited to, Fluorescein, Hydroxycoumarin, Aminocoumarin, Methoxycoumarin, Cascade Blue, Pacific Blue, Pacific Orange, Lucifer yellow, NBD, R-Phycoerythrin (PE), PE-Cy5 conjugates, PE-Cy7 conjugates, Red 613, PerCP, TruRed, FluorX, BODIPY-FL, TRITC, X-Rhodamine, Lissamine Rhodamine B, Texas Red, Allophycocyanin (APC), APC-Cy7 conjugates, Cy2, Cy3, Cy3B, Cy3.5, Cy5, Cy5.5, Cy7, Hoechst 33342, DAPI, Hoechst 33258, SYTOX Blue, Chromomycin A3, Mithramycin, YOYO-1, Ethidium Bromide, Acridine Orange, SYTOX Green, TOTO-1, TO-PRO-1, Thiazole Orange, Propidium Iodide (PI), LDS 751, 7-AAD, SYTOX Orange, TOTO-3, TO-PRO-3, DRAQS, Indo-1, Fluo-3, DCFH, DHR, SNARF, Y66H, Y66F, EBFP, EBFP2, Azurite, GFPuv, T-Sapphire, TagBFP, Cerulean, mCFP, ECFP, CyPet, Y66 W, dKeima-Red, mKeima-Red, TagCFP, AmCyan1, mTFP1 (Teal), S65A, Midoriishi-Cyan, Wild Type GFP, S65C, TurboGFP, TagGFP, TagGFP2, AcGFP1, S65L, Emerald, S65T, EGFP, Azami-Green, ZsGreen1, Dronpa-Green, TagYFP, EYFP, Topaz, Venus, mCitrine, YPet, TurboYFP, PhiYFP, PhiYFP-m, ZsYellow1, mBanana, Kusabira-Orange, mOrange, mOrange2, mKO, TurboRFP, tdTomato, DsRed-Express2, TagRFP, DsRed monomer, DsRed2 ("RFP"), mStrawberry, TurboFP602, AsRed2, mRFP1, J-Red, mCherry, HcRed1, mKate2, Katushka (TurboFP635), mKate (TagFP635), TurboFP635, mPlum, mRaspberry, mNeptune, E2-Crimson, Monochlorobimane, Calcein, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 647, Alexa Fluor 660, Alexa Fluor 680, Alexa Fluor 700, Alexa Fluor 750, Alexa Fluor 790, and HyPer, or the like.

In some instances, the fluorochrome panel includes one or more polymeric dyes (e.g., fluorescent polymeric dyes). Fluorescent polymeric dyes that find use in the subject methods and systems are varied. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where $\pi$-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Any convenient polymeric dye may be utilized in the subject devices and methods. In some instances, a polymeric dye is a multichromophore that has a structure capable of harvesting light to amplify the fluorescent output of a fluorophore. In some instances, the polymeric dye is capable of harvesting light and efficiently converting it to emitted light at a longer wavelength. In some cases, the polymeric dye has a light-harvesting multichromophore system that can efficiently transfer energy to nearby luminescent species (e.g., a "signaling chromophore"). Mechanisms for energy transfer include, for example, resonant energy transfer (e.g., Forster (or fluorescence) resonance energy transfer, FRET), quantum charge exchange (Dexter energy transfer), and the like. In some instances, these energy transfer mechanisms are relatively short range; that is, close proximity of the light harvesting multichromophore system to the signaling chromophore provides for efficient energy transfer. Under conditions for efficient energy transfer, amplification of the emission from the signaling chromophore occurs when the number of individual chromophores in the light harvesting multichromophore system is large; that is, the emission from the signaling chromophore is more intense when the incident light (the "excitation light") is at a wavelength which is absorbed by the light harvesting multichromophore system than when the signaling chromophore is directly excited by the pump light.

The multichromophore may be a conjugated polymer. Conjugated polymers (CPs) are characterized by a delocalized electronic structure and can be used as highly responsive optical reporters for chemical and biological targets. Because the effective conjugation length is substantially shorter than the length of the polymer chain, the backbone contains a large number of conjugated segments in close proximity. Thus, conjugated polymers are efficient for light harvesting and enable optical amplification via Forster energy transfer.

Polymeric dyes of interest include, but are not limited to, those dyes described in U.S. Pat. Nos. 7,270,956; 7,629,448; 8,158,444; 8,227,187; 8,455,613; 8,575,303; 8,802,450; 8,969,509; 9,139,869; 9,371,559; 9,547,008; 10,094,838; 10,302,648; 10,458,989; 10,641,775 and 10,962,546 the disclosures of which are herein incorporated by reference in their entirety; and Gaylord et al., *J. Am. Chem. Soc.,* 2001, 123 (26), pp 6417-6418; Feng et al., *Chem. Soc. Rev.,* 2010, 39, 2411-2419; and Traina et al., *J. Am. Chem. Soc.,* 2011, 133 (32), pp 12600-12607, the disclosures of which are herein incorporated by reference in their entirety. Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA). Any fluorochromes that are known to a skilled artisan—including, but not limited to, those described above—or are yet to be discovered may be employed in the subject methods.

Fluorochromes in the subject fluorochrome panels and/or fluorochromes referenced in the spectral matrix may or may not be coupled to a biomolecule, such as a biological macromolecule. The biological macromolecule may be a biopolymer. A "biopolymer" is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. Specifically, a "biopolymer" includes DNA (including cDNA), RNA and oligonucleotides, regardless of the source. As such, biomolecules may include polysaccharides, nucleic acids and polypeptides. For example, the nucleic acid may be an oligonucleotide, truncated or full-length DNA or RNA. In embodiments, oligonucleotides, truncated and full-length DNA or RNA are comprised of 10 nucleotide monomers or more, such as 15 or more, such as 25 or more, such as 50 or more, such as 100 or more, such as 250 or more and including 500 nucleotide monomers or more. For example, oligonucleotides, truncated and full-length DNA or RNA of interest may range in length from 10 nucleotides to $10^8$ nucleotides, such as from $10^2$ nucleotides to $10^7$ nucleotides, including from $10^3$ nucleotides to $10^6$ nucleotides. In embodiments, biopolymers are not single nucleotides or short chain oligonucleotides (e.g., less than 10 nucleotides). By "full length" is meant that the DNA or RNA is a nucleic acid polymer having 70% or more of its complete sequence (such as found in nature), such as 75% or more, such as 80% or more, such as 85% or more, such as 90% or more, such as 95% or more, such as 97% or more, such as 99% or more and including 100% of the full length sequence of the DNA or RNA (such as found in nature)

Polypeptides may be, in certain instances, truncated or full length proteins, enzymes or antibodies. In embodiments, polypeptides, truncated and full-length proteins, enzymes or antibodies are comprised of 10 amino acid monomers or more, such as 15 or more, such as 25 or more, such as 50 or more, such as 100 or more, such as 250 or more and including 500 amino acid monomers or more. For example, polypeptides, truncated and full-length proteins, enzymes or antibodies of interest may range in length from 10 amino acids to $10^8$ amino acids, such as from $10^2$ amino acids to $10^7$ amino acids, including from $10^3$ amino acids to $10^6$ amino acids. In embodiments, biopolymers are not single amino acids or short chain polypeptides (e.g., less than 10 amino acids). By "full length" is meant that the protein, enzyme or antibody is a polypeptide polymer having 70% or more of its complete sequence (such as found in nature), such as 75% or more, such as 80% or more, such as 85% or more, such as 90% or more, such as 95% or more, such as 97% or more, such as 99% or more and including 100% of the full length sequence of the protein, enzyme or antibody (such as found in nature).

In some instances, the fluorochrome is conjugated to a specific binding member. The specific binding member and the fluorochrome can be conjugated (e.g., covalently linked) to each other at any convenient locations of the two molecules, via an optional linker. As used herein, the term "specific binding member" refers to one member of a pair of molecules which have binding specificity for one another. One member of the pair of molecules may have an area on its surface, or a cavity, which specifically binds to an area on the surface of, or a cavity in, the other member of the pair of molecules. Thus, the members of the pair have the property of binding specifically to each other to produce a binding complex. In some embodiments, the affinity between specific binding members in a binding complex is characterized by a $K_d$ (dissociation constant) of $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, including $10^{-15}$ M or less. In some embodiments, the specific binding members specifically bind with high avidity. By high avidity is meant that the binding member specifically binds with an apparent affinity characterized by an apparent $K_d$ of $10\times10^{-9}$ M or less, such as $1\times10^{-9}$ M or less, $3\times10^{-10}$ M or less, $1\times10^{-10}$ M or less, $3\times10^{-11}$ M or less, $1\times10^{-11}$ M or less, $3\times10^{-12}$ M or less or $1\times10^{-12}$ M or less.

The specific binding member can be proteinaceous. As used herein, the term "proteinaceous" refers to a moiety that is composed of amino acid residues. A proteinaceous moiety can be a polypeptide. In certain cases, the proteinaceous specific binding member is an antibody. In certain embodiments, the proteinaceous specific binding member is an antibody fragment, e.g., a binding fragment of an antibody that specific binds to a polymeric dye. As used herein, the terms "antibody" and "antibody molecule" are used interchangeably and refer to a protein consisting of one or more polypeptides substantially encoded by all or part of the recognized immunoglobulin genes. The recognized immunoglobulin genes, for example in humans, include the kappa (k), lambda (l), and heavy chain genetic loci, which together comprise the myriad variable region genes, and the constant region genes mu (u), delta (d), gamma (g), sigma (e), and alpha (a) which encode the IgM, IgD, IgG, IgE, and IgA isotypes respectively. An immunoglobulin light or heavy chain variable region consists of a "framework" region (FR) interrupted by three hypervariable regions, also called "complementarity determining regions" or "CDRs". The extent of the framework region and CDRs have been precisely defined (see, "Sequences of Proteins of Immunological Interest," E. Kabat et al., U.S. Department of Health and Human Services, (1991)). The sequences of the framework regions of different light or heavy chains are relatively conserved within a species. The framework region of an antibody, that is the combined framework regions of the constituent light and heavy chains, serves to position and align the CDRs. The CDRs are primarily responsible for binding to an epitope of an antigen. The term antibody is meant to include full length antibodies and may refer to a natural antibody from any organism, an engineered antibody, or an antibody generated recombinantly for experimental, therapeutic, or other purposes as further defined below. Antibody fragments of interest include, but are not limited to, Fab, Fab', F(ab')2, Fv, scFv, or other antigen-binding subsequences of antibodies, either produced by the modification of whole antibodies or those synthesized de novo using recombinant DNA technologies. Antibodies may be monoclonal or polyclonal and may have other specific activities on cells (e.g., antagonists, agonists, neutralizing, inhibitory, or stimulatory antibodies). It is understood that the antibodies may have additional conservative amino acid substitutions which have substantially no effect on antigen binding or other antibody functions. In certain embodiments, the specific binding member is a Fab fragment, a $F(ab')_2$ fragment, a scFv, a diabody or a triabody. In certain embodiments, the specific binding member is an antibody. In some cases, the specific binding member is a murine antibody or binding fragment thereof. In certain instances, the specific binding member is a recombinant antibody or binding fragment thereof.

As discussed above, biological markers of interest for the subject methods include clusters of differentiation (CD) molecules. Non-limiting examples of CD molecules that may be employed include: CD1, CD1a, CD1b, CD1c, CD1d, CD1e, CD2, CD3, CD3d, CD3e, CD3g, CD4, CD5, CD6, CD7, CD8, CD8a, CD8b, CD9, CD10, CD11a, CD11 b, CD11c, CD11d, CD13, CD14, CD15, CD16, CD16a, CD16b, CD17, CD18, CD19, CD20, CD21, CD22, CD23, CD24, CD25, CD26, CD27, CD28, CD29, CD30, CD31, CD32A, CD32B, CD33, CD34, CD35, CD36, CD37, CD38, CD39, CD40, CD41, CD42, CD42a, CD42b, CD42c, CD42d, CD43, CD44, CD45, CD46, CD47, CD48, CD49a, CD49b, CD49c, CD49d, CD49e, CD49f, CD50, CD51, CD52, CD53, CD54, CD55, CD56, CD57, CD58, CD59, CD60a, CD60b, CD60c, CD61, CD62E, CD62L, CD62P, CD63, CD64a, CD65, CD65s, CD66a, CD66b, CD66c, CD66d, CD66e, CD66f, CD68, CD69, CD70, CD71, CD72, CD73, CD74, CD75, CD75s, CD77, CD79A, CD79B, CD80, CD81, CD82, CD83, CD84, CD85A, CD85B, CD85C, CD85D, CD85F, CD85G, CD85H, CD85I, CD85J, CD85K, CD85M, CD86, CD87, CD88, CD89, CD90, CD91, CD92, CD93, CD94, CD95, CD96, CD97, CD98, CD99, CD100, CD101, CD102, CD103, CD104, CD105, CD106, CD107, CD107a, CD107b, CD108, CD109, CD110, CD111, CD112, CD113, CD114, CD115, CD116, CD117, CD118, CD119, CD120, CD120a, CD120b, CD121a, CD121b, CD122, CD123, CD124, CD125, CD126, CD127, CD129, CD130, CD131, CD132, CD133, CD134, CD135, CD136, CD137, CD138, CD139, CD140A, CD140B, CD141, CD142, CD143, CD144, CDw145, CD146, CD147, CD148, CD150, CD151, CD152, CD153, CD154, CD155, CD156, CD156a, CD156b, CD156c, CD157, CD158, CD158A, CD15861, CD15862, CD158C, CD158D, CD158E1, CD158E2, CD158F1, CD158F2, CD158G, CD158H, CD158I, CD158J, CD158K, CD159a, CD159c, CD160, CD161, CD162, CD163, CD164, CD165, CD166, CD167a, CD167b, CD168, CD169, CD170, CD171, CD172a, CD172b, CD172g, CD173, CD174, CD175, CD175s, CD176, CD177, CD178, CD179a, CD179b, CD180, CD181, CD182, CD183, CD184, CD185, CD186, CD187, CD188, CD189, CD190, CD191, CD192, CD193, CD194, CD195, CD196, CD197, CDw198, CDw199, CD200, CD201, CD202b, CD203a, CD203c, CD204, CD205, CD206, CD207, CD208, CD209, CD210, CDw210a, CDw210b, CD211, CD212, CD213a1, CD213a2, CD214, CD215, CD216, CD217, CD218a, CD218b, CD219, CD220, CD221, CD222, CD223, CD224, CD225, CD226, CD227, CD228, CD229, CD230, CD231, CD232, CD233, CD234, CD235a, CD235b, CD236, CD237, CD238, CD239, CD240CE, CD240D, CD241, CD242, CD243, CD244, CD245, CD246, CD247, CD248, CD249, CD250, CD251, CD252, CD253, CD254, CD255, CD256, CD257, CD258, CD259, CD260, CD261, CD262, CD263, CD264, CD265, CD266, CD267, CD268, CD269, CD270, CD271, CD272, CD273, CD274, CD275, CD276, CD277, CD278, CD279, CD280, CD281, CD282, CD283, CD284, CD285, CD286, CD287, CD288, CD289, CD290, CD291, CD292, CDw293, CD294, CD295, CD296, CD297, CD298, CD299, CD300A, CD300C, CD301, CD302, CD303, CD304, CD305, CD306, CD307, CD307a, CD307b, CD307c, CD307d, CD307e, CD308, CD309, CD310, CD311, CD312, CD313, CD314, CD315, CD316, CD317, CD318, CD319, CD320, CD321, CD322, CD323, CD324, CD325, CD326, CD327, CD328, CD329, CD330, CD331, CD332, CD333, CD334, CD335, CD336, CD337, CD338, CD339, CD340, CD344, CD349, CD351, CD352, CD353, CD354, CD355, CD357, CD358, CD360, CD361, CD362, CD363, CD364, CD365, CD366, CD367, CD368, CD369, CD370, and CD371.

In embodiments, the subject fluorochrome panels are employed to analyze a sample. In some instances, the sample analyzed is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen, or the like.

As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Fluorochromes in the fluorochrome panel may be configured to target different types of cells (e.g., via an antibody targeted to that cell, etc.). A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11 b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In certain embodiments, fluorochrome panels identified via the present methods may be employed in a flow cytometric protocol (e.g., to analyze a sample, such as those discussed above). In practicing such methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods of embodiments of the invention include irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, light from the irradiated sample is conveyed to a light detection system and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Systems for Assessing a Fluorochrome Panel

Aspects of the invention additionally include systems configured to perform the above-described methods. Systems of interest include a processor configured to assess the suitability of a fluorochrome panel for use in a flow cytometric protocol. In embodiments, the subject processors are operated in conjunction with programmable logic that may be implemented in hardware, software, firmware, or any combination thereof in order to assess a fluorochrome panel. For example, where programmable logic is implemented in software, fluorochrome panel assessment may be realized at least in part by a computer-readable data storage medium comprising program code including instructions that, when executed, are configured to receive an initial fluorochrome panel comprising a set of fluorochrome identifiers each referring to a fluorochrome in a set of fluorochromes, and a set of biological marker identifiers each associated with a fluorochrome identifier in the set of fluorochrome identifiers; a plurality of population identifiers each referring to a particle population; and an instrument identifier. The processor is additionally configured to create a set of population-marker pairs by associating each population identifier in the plurality of population identifiers with a biological marker identifier from the set of biological marker identifiers, and generate a set of separability metrics each predicting a measure of statistical distance between particle populations in flow cytometer data space. As discussed above, each measure of statistical distance is related to a detected signal intensity that would result from each fluorochrome associated with each population-marker pair being employed in a flow cytometric protocol using an instrument associated with the instrument identifier. The processor described herein is also configured to aggregate the set of separability metrics into a panel score, and evaluate the panel score to assess the suitability of the initial fluorochrome panel for use in the flow cytometric protocol.

The processor may additionally be configured to optimize the fluorochrome panel based on the assessment of the suitability of the fluorochrome panel for use in generating the flow cytometer data. As discussed above, panel optimization algorithms for use in optimizing fluorochrome panels include, but are not limited to, constrained optimization methods. In some embodiments, the processor is configured to produce a visualization of the assessed suitability of the fluorochrome panel for use in generating the flow cytometer data. In some such embodiments, the system includes a display configured to portray the visualization. Any suitable display may be employed. The subject display may include, but is not limited to, a monitor, a tablet computer, a smartphone, or other electronic device configured to present graphical interfaces.

The subject programmable logic may be implemented in any of a variety of devices such as specifically programmed event processing computers, wireless communication devices, integrated circuit devices, or the like. In some embodiments, the programable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

In certain instances, the system is or includes a particle analyzer. Particle analyzers of interest may include a flow cell for transporting particles in a flow stream, a light source for irradiating the particles in the flow stream at an interrogation point, and a particle-modulated light detector for detecting particle-modulated light. In certain embodiments, the particle analyzer is a flow cytometer. In some cases where the particle analyzer is a flow cytometer, said flow cytometer is a full spectrum flow cytometer.

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 μm or greater increments, such as 0.05 μm or greater, such as 0.1 μm or greater, such as 0.5 μm or greater such as 1 μm or greater, such as 10 μm or greater, such as 100 μm or greater, such as 500 μm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, particle analyzers of interest may further include one or more particle-modulated light detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more particle-modulated light detector(s) may include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry,* 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6BD, FACSDiscover™ S8 Cell Sorter cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference. In such instances, flow cytometric data may include image data of particles, e.g., cells present in the sample. See, e.g., Schraivogel et al., Science Vol. 375(6578); 315-320 (2022), the disclosure of which is incorporated herein in its entirety, as well as U.S. Provisional Patent Application Ser. No. 63/256,974), the disclosure of which is incorporated herein in its entirety. An example of such a system is FACSDiscover™ S8 Cell Sorter cell sorter.

Figure 2:
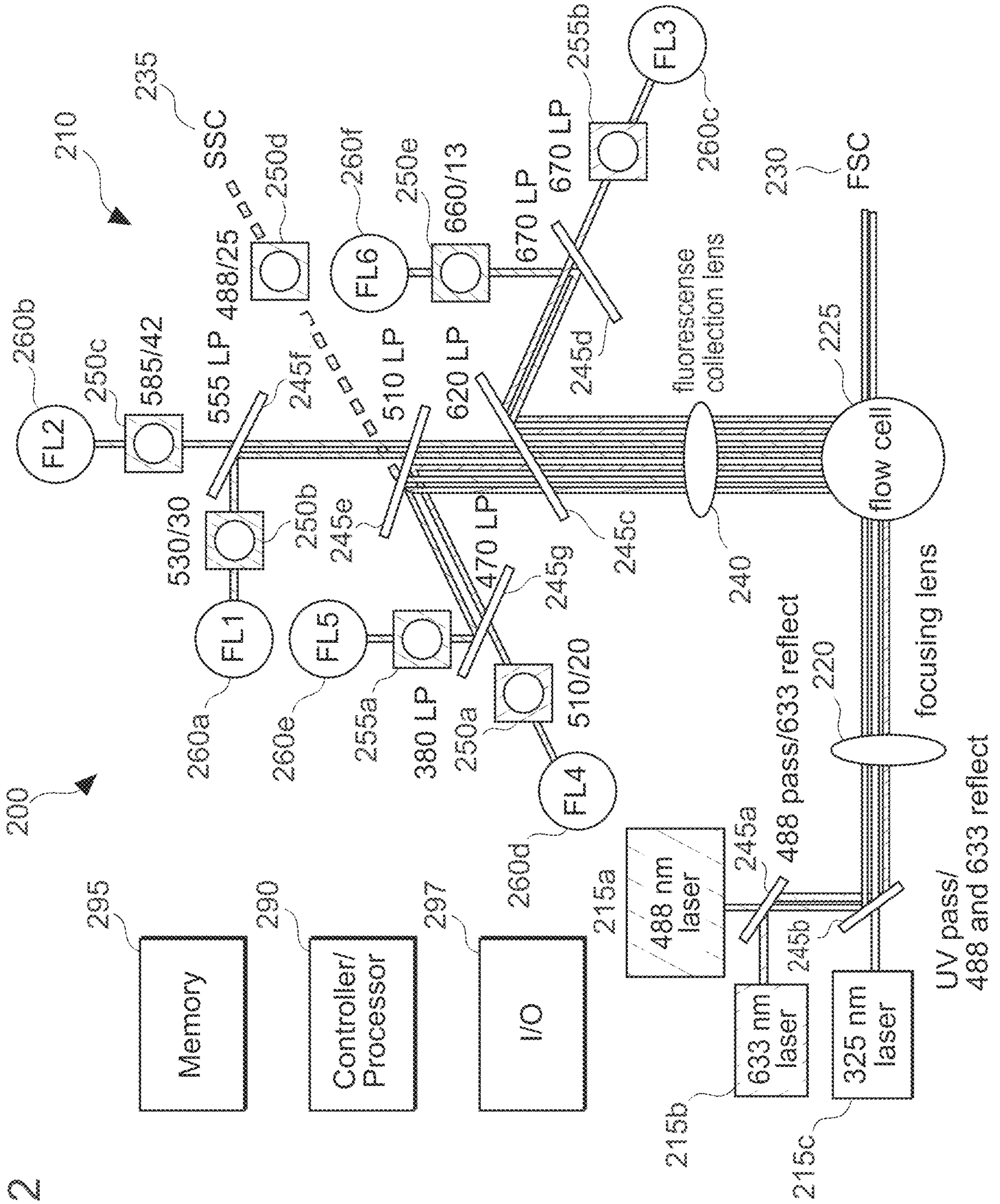
FIG. 2 depicts a functional block diagram of a flow cytometric system according to certain embodiments.

FIG. 2 shows a system 200 for flow cytometry in accordance with an illustrative embodiment of the present invention. The system 200 includes a flow cytometer 210, a controller/processor 290 and a memory 295. The flow cytometer 210 includes one or more excitation lasers 215*a*-215*c*, a focusing lens 220, a flow chamber 225, a forward-scatter detector 230, a side-scatter detector 235, a fluorescence collection lens 240, one or more beam splitters 245*a*-245*g*, one or more bandpass filters 250*a*-250*e*, one or more longpass ("LP") filters 255*a*-255*b*, and one or more fluorescent detectors 260*a*-260*f*.

The excitation lasers 215*a-c* emit light in the form of a laser beam. The wavelengths of the laser beams emitted from excitation lasers 215*a*-215*c* are 488 nm, 633 nm, and 325 nm, respectively, in the example system of FIG. 2. The laser beams are first directed through one or more of beam splitters 245*a* and 245*b*. Beam splitter 245*a* transmits light at 488 nm and reflects light at 633 nm. Beam splitter 245*b* transmits UV light (light with a wavelength in the range of 10 to 400 nm) and reflects light at 488 nm and 633 nm.

The laser beams are then directed to a focusing lens 220, which focuses the beams onto the portion of a fluid stream where particles of a sample are located, within the flow chamber 225. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 230, the side-scatter detector 235, and the one or more fluorescent detectors 260*a*-260*f* through one or more of the beam splitters 245*c*-245*g*, the bandpass filters 250*a*-250*e*, the longpass filters 255*a*-255*b*, and the fluorescence collection lens 240.

The fluorescence collection lens 240 collects light emitted from the particle-laser beam interaction and routes that light towards one or more beam splitters and filters. Bandpass filters, such as bandpass filters 250*a*-250*e*, allow a narrow range of wavelengths to pass through the filter. For example, bandpass filter 250*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 255*a*-255*b*, transmit wavelengths of light equal to or longer than a specified wavelength of light. For example, longpass filter 255*b*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 230 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 235 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 260*a*-260*f*. The side-scatter detector 235 and fluorescent detectors can include photomultiplier tubes. The signals detected at the forward-scatter detector 230, the side-scatter detector 235 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 2, but can include any flow cytometer known in the art. For example, a flow cytometer may have any number of lasers, beam splitters, filters, and detectors at various wavelengths and in various different configurations.

In operation, cytometer operation is controlled by a controller/processor 290, and the measurement data from the detectors can be stored in the memory 295 and processed by the controller/processor 290. Although not shown explicitly, the controller/processor 290 is coupled to the detectors to receive the output signals therefrom, and may also be coupled to electrical and electromechanical components of the flow cytometer 210 to control the lasers, fluid flow parameters, and the like. Input/output (I/O) capabilities 297 may be provided also in the system. The memory 295, controller/processor 290, and I/O 297 may be entirely provided as an integral part of the flow cytometer 210. In such an embodiment, a display may also form part of the I/O capabilities 297 for presenting experimental data to users of the cytometer 210. Alternatively, some or all of the memory 295 and controller/processor 290 and I/O capabilities may be part of one or more external devices such as a general purpose computer. In some embodiments, some or all of the memory 295 and controller/processor 290 can be in wireless or wired communication with the cytometer 210. The controller/processor 290 in conjunction with the memory 295 and the I/O 297 can be configured to perform various functions related to the preparation and analysis of a flow cytometer experiment.

The system illustrated in FIG. 2 includes six different detectors that detect fluorescent light in six different wavelength bands (which may be referred to herein as a "filter window" for a given detector) as defined by the configuration of filters and/or splitters in the beam path from the flow cell 225 to each detector. Different fluorescent molecules in a fluorochrome panel used for a flow cytometer experiment will emit light in their own characteristic wavelength bands. The particular fluorescent labels used for an experiment and their associated fluorescent emission bands may be selected to generally coincide with the filter windows of the detectors. The I/O 297 can be configured to receive data regarding a flow cytometer experiment having a panel of fluorescent labels and a plurality of cell populations having a plurality of markers, each cell population having a subset of the plurality of markers. The I/O 297 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 295. The controller/processor 290 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 3:
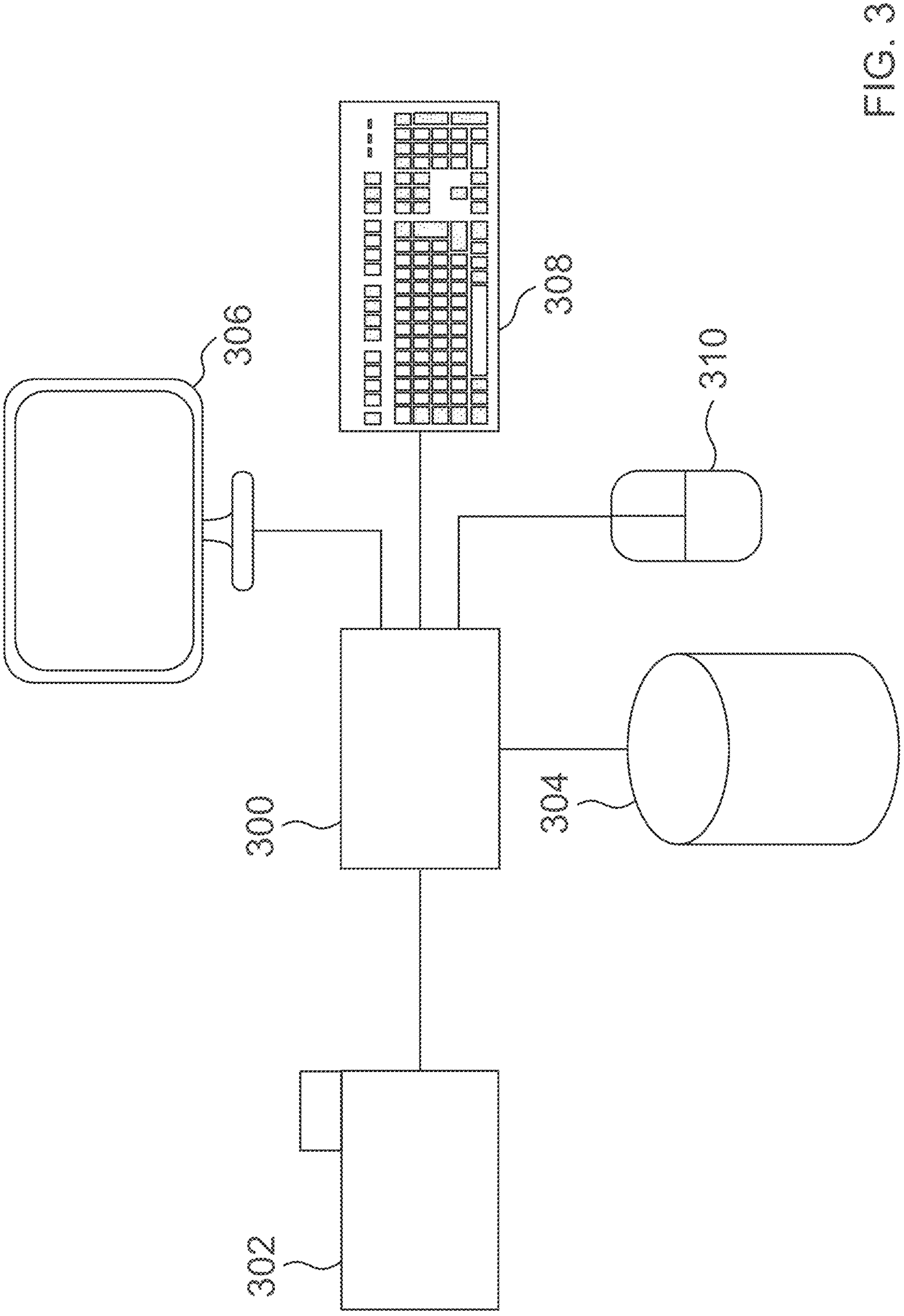
FIG. 3 depicts a control system according to certain embodiments.

FIG. 3 shows a functional block diagram for one example of a control system, such as a processor 300, for analyzing and displaying biological events. A processor 300 can be configured to implement a variety of processes for controlling graphic display of biological events.

A flow cytometer or sorting system 302 can be configured to acquire biological event data. For example, a flow cytometer can generate flow cytometric event data (e.g., particle-modulated light data). The flow cytometer 302 can be configured to provide biological event data to the processor 300. A data communication channel can be included between the flow cytometer 302 and the processor 300. The biological event data can be provided to the processor 300 via the data communication channel.

The processor 300 can be configured to receive biological event data from the flow cytometer 302. The biological event data received from the flow cytometer 302 can include flow cytometric event data. The processor 300 can be configured to provide a graphical display including a first plot of biological event data to a display device 306. The processor 300 can be further configured to render a region of interest as a gate (e.g., a first gate) around a population of biological event data shown by the display device 306, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 300 can be further configured to display the biological event data on the display device 306 within the gate differently from other events in the biological event data outside of the gate. For example, the processor 300 can be configured to render the color of biological event data contained within the gate to be distinct from the color of biological event data outside of the gate. The display device 306 can be implemented as a monitor, a tablet computer, a smartphone, or other electronic device configured to present graphical interfaces.

The processor 300 can be configured to receive a gate selection signal identifying the gate from a first input device. For example, the first input device can be implemented as a mouse 310. The mouse 310 can initiate a gate selection signal to the processor 300 identifying the gate to be displayed on or manipulated via the display device 306 (e.g., by clicking on or in the desired gate when the cursor is positioned there). In some implementations, the first device can be implemented as the keyboard 308 or other means for providing an input signal to the processor 300 such as a touchscreen, a stylus, an optical detector, or a voice recognition system. Some input devices can include multiple inputting functions. In such implementations, the inputting functions can each be considered an input device. For example, as shown in FIG. 3, the mouse 310 can include a right mouse button and a left mouse button, each of which can generate a triggering event.

The triggering event can cause the processor 300 to alter the manner in which the data is displayed, which portions of the data is actually displayed on the display device 306, and/or provide input to further processing such as selection of a population of interest for particle sorting.

In some embodiments, the processor 300 can be configured to detect when gate selection is initiated by the mouse 310. The processor 300 can be further configured to automatically modify plot visualization to facilitate the gating process. The modification can be based on the specific distribution of biological event data received by the processor 300. In some embodiments, the processor 300 expands the first gate such that a second gate is generated (e.g., as discussed above).

The processor 300 can be connected to a storage device 304. The storage device 304 can be configured to receive and store biological event data from the processor 300. The storage device 304 can also be configured to receive and store flow cytometric event data from the processor 300. The storage device 304 can be further configured to allow retrieval of biological event data, such as flow cytometric event data, by the processor 300.

The display device 306 can be configured to receive display data from the processor 300. The display data can comprise plots of biological event data and gates outlining sections of the plots. The display device 306 can be further configured to alter the information presented according to input received from the processor 300 in conjunction with input from the flow cytometer 302, the storage device 304, the keyboard 308, and/or the mouse 310.

Processor 300 may additionally be configured to assess a fluorochrome panel. In such cases, processor 300 is configured to receive an initial fluorochrome panel comprising a set of fluorochrome identifiers each referring to a fluorochrome in a set of fluorochromes, and a set of biological marker identifiers each associated with a fluorochrome identifier in the set of fluorochrome identifiers; a plurality of population identifiers each referring to a particle population; and an instrument identifier. Processor 300 may also be configured to create a set of population-marker pairs by associating each population identifier in the plurality of population identifiers with a biological marker identifier from the set of biological marker identifiers, generate a set of separability metrics each predicting a measure of statistical distance between particle populations in flow cytometer data space, aggregate the set of separability metrics into a panel score, and evaluate the panel score to assess the suitability of the initial fluorochrome panel for use in the flow cytometric protocol. In certain cases, processor 300 is also configured to generate a visualization based on the assessment of the fluorochrome panel. This visualization may, in some cases, be shown on display device 306.

In some implementations the processor 300 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 4A:
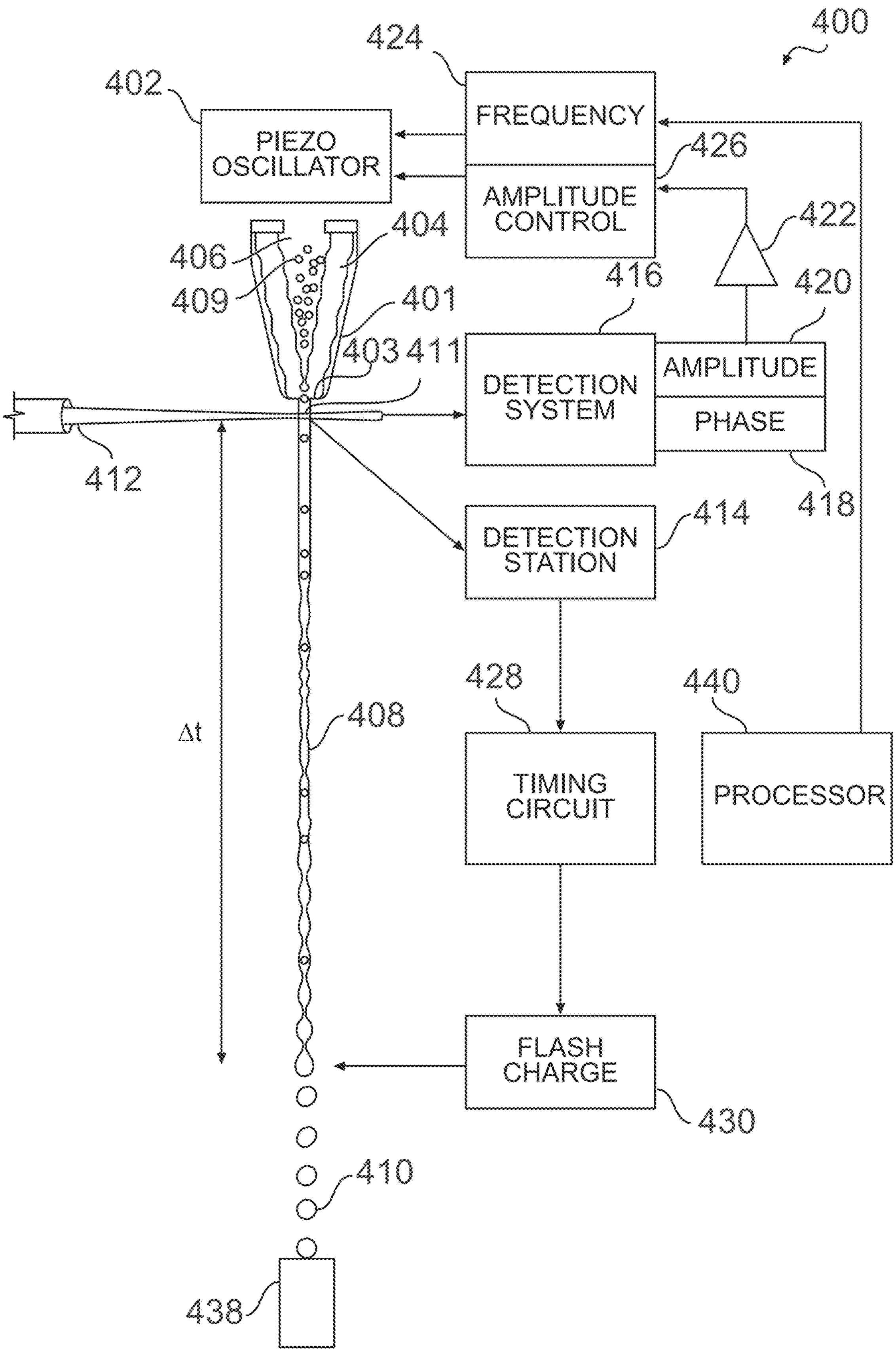
FIG. 4A-4B depicts a schematic drawing of a particle sorter system according to certain embodiments.

FIG. 4A is a schematic drawing of a particle sorter system 400 (e.g., the flow cytometer 302) in accordance with one embodiment presented herein. In some embodiments, the particle sorter system 400 is a cell sorter system. As shown in FIG. 4A, a drop formation transducer 402 (e.g., piezo-oscillator) is coupled to a fluid conduit 401, which can be coupled to, can include, or can be, a nozzle 403. Within the fluid conduit 401, sheath fluid 404 hydrodynamically focuses a sample fluid 406 comprising particles 409 into a moving fluid column 408 (e.g., a stream). Within the moving fluid column 408, particles 409 (e.g., cells) are lined up in single file to cross a monitored area 411 (e.g., where laser-stream intersect), irradiated by an irradiation source 412 (e.g., a laser). Vibration of the drop formation transducer 402 causes moving fluid column 408 to break into a plurality of drops 410, some of which contain particles 409.

In operation, a detection station 414 (e.g., an event detector) identifies when a particle of interest (or cell of interest) crosses the monitored area 411. Detection station 414 feeds into a timing circuit 428, which in turn feeds into a flash charge circuit 430. At a drop break off point, informed by a timed drop delay (at), a flash charge can be applied to the moving fluid column 408 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 4A, the drops can be collected in a drain receptacle 438.

A detection system 416 (e.g., a drop boundary detector) serves to automatically determine the phase of a drop drive signal when a particle of interest passes the monitored area 411. An exemplary drop boundary detector is described in U.S. Pat. No. 7,679,039, which is incorporated herein by reference in its entirety. The detection system 416 allows the instrument to accurately calculate the place of each detected particle in a drop. The detection system 416 can feed into an amplitude signal 420 and/or phase 418 signal, which in turn feeds (via amplifier 422) into an amplitude control circuit 426 and/or frequency control circuit 424. The amplitude control circuit 426 and/or frequency control circuit 424, in turn, controls the drop formation transducer 402. The amplitude control circuit 426 and/or frequency control circuit 424 can be included in a control system.

In some implementations, sort electronics (e.g., the detection system 416, the detection station 414 and a processor 440) can be coupled with a memory configured to store the detected events and a sort decision based thereon. The sort decision can be included in the event data for a particle. In some implementations, the detection system 416 and the detection station 414 can be implemented as a single detection unit or communicatively coupled such that an event measurement can be collected by one of the detection system 416 or the detection station 414 and provided to the non-collecting element.

Figure 4B:
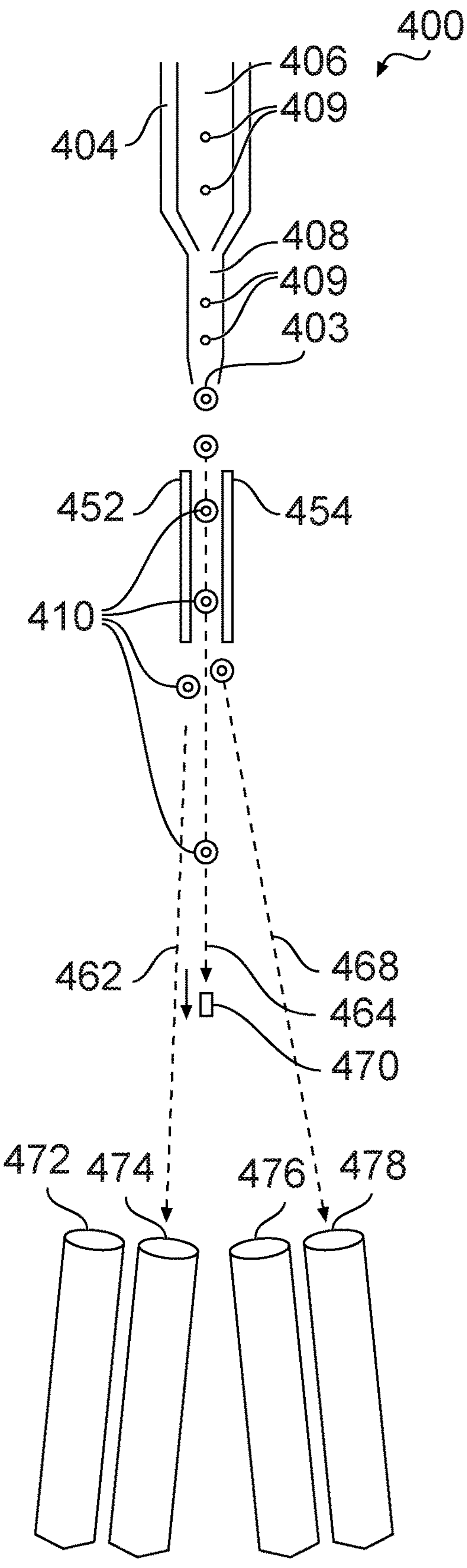

FIG. 4B is a schematic drawing of a particle sorter system, in accordance with one embodiment presented herein. The particle sorter system 400 shown in FIG. 4B, includes deflection plates 452 and 454. A charge can be applied via a stream-charging wire in a barb. This creates a stream of droplets 410 containing particles 409 for analysis. The particles can be illuminated with one or more light sources (e.g., lasers) to generate light scatter and fluorescence information. The information for a particle is analyzed such as by sorting electronics or other detection system (not shown in FIG. 4B). The deflection plates 452 and 454 can be independently controlled to attract or repel the charged droplet to guide the droplet toward a destination collection vessel (e.g., one of 472, 474, 476, or 478). As shown in FIG. 4B, the deflection plates 452 and 454 can be controlled to direct a particle along a first path 462 toward the vessel 474 or along a second path 468 toward the vessel 478. If the particle is not of interest (e.g., does not exhibit scatter or illumination information within a specified sort range), deflection plates may allow the particle to continue along a flow path 464. Such uncharged droplets may pass into a waste receptacle such as via aspirator 470.

The sorting electronics can be included to initiate collection of measurements, receive fluorescence signals for particles, and determine how to adjust the deflection plates to cause sorting of the particles. Example implementations of the embodiment shown in FIG. 4B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems include one or more computers for complete automation or partial automation. In some embodiments, systems include a computer with a computer program stored thereon, where the computer program when loaded on the computer includes instructions for assessing the suitability of a fluorochrome panel for use in a flow cytometric protocol. In some cases, the instructions cause the computer to receive an initial fluorochrome panel comprising a set of fluorochrome identifiers each referring to a fluorochrome in a set of fluorochromes, and a set of biological marker identifiers each associated with a fluorochrome identifier in the set of fluorochrome identifiers, a plurality of population identifiers each referring to a particle population, and an instrument identifier. The instructions also cause the processor to create a set of population-marker pairs by associating each population identifier in the plurality of population identifiers with a biological marker identifier from the set of biological marker identifiers, and generate a set of separability metrics each predicting a measure of statistical distance between particle populations in flow cytometer data space, where each measure of statistical distance is related to a detected signal intensity that would result from each fluorochrome associated with each population-marker pair being employed in a flow cytometric protocol using an instrument associated with the instrument identifier. In embodiments, the instructions also cause the processor to aggregate the set of separability metrics into a panel score, and evaluate said panel score to assess the suitability of the initial fluorochrome panel for use in the flow cytometric protocol. In some instances, the system is, or comprises, a flow cytometer.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Figure 5:
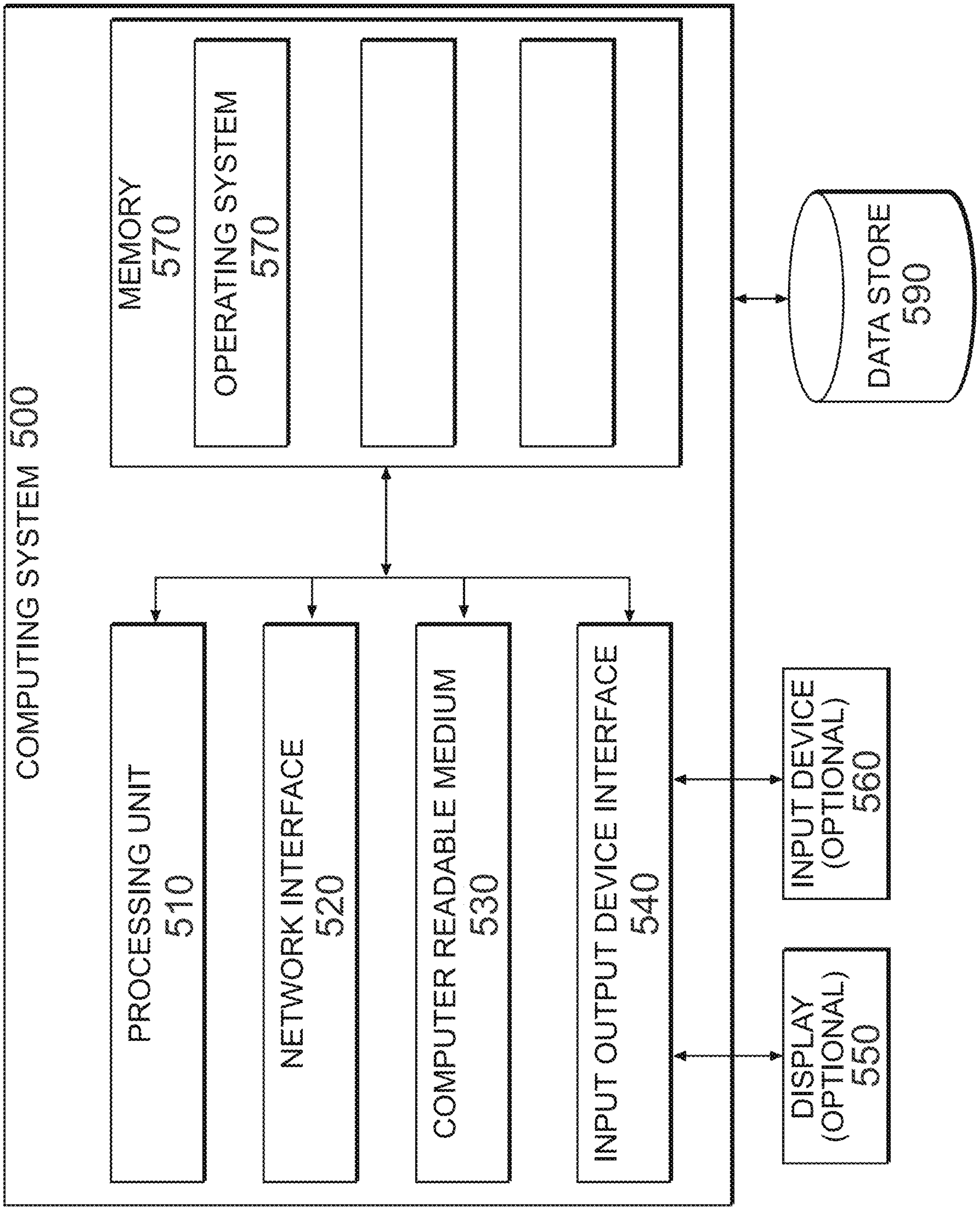
FIG. 5 depicts a block diagram of a computing system according to certain embodiments.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM I®, Android™, SGI IRIX®, Oracle Solaris® and others. FIG. 5 depicts a general architecture of an example computing device 500 according to certain embodiments. The general architecture of the computing device 500 depicted in FIG. 5 includes an arrangement of computer hardware and software components. It is not necessary, however, that all of these generally conventional elements be shown in order to provide an enabling disclosure. As illustrated, the computing device 500 includes a processing unit 510, a network interface 520, a computer readable medium drive 530, an input/output device interface 540, a display 550, and an input device 560, all of which may communicate with one another by way of a communication bus. The network interface 520 may provide connectivity to one or more networks or computing systems. The processing unit 510 may thus receive information and instructions from other computing systems or services via a network. The processing unit 510 may also communicate to and from memory 570 and further provide output information for an optional display 550 via the input/output device interface 540. For example, an analysis software (e.g., data analysis software or program such as FlowJo®) stored as executable instructions in the non-transitory memory of the analysis system can display the flow cytometry event data to a user. The input/output device interface 540 may also accept input from the optional input device 560, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 510 executes in order to implement one or more embodiments. The memory 570 generally includes RAM, ROM and/or other persistent, auxiliary or non-transitory computer-readable media. The memory 570 may store an operating system 572 that provides computer program instructions for use by the processing unit 510 in the general administration and operation of the computing device 500. Data may be stored in data storage device 590. The memory 570 may further include computer program instructions and other information for implementing aspects of the present disclosure.

Computer-Readable Storage Media

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. In some cases, the instructions, when executed by a computer or processor, cause the computer or processor to receive an initial fluorochrome panel comprising a set of fluorochrome identifiers each referring to a fluorochrome in a set of fluorochromes, and a set of biological marker identifiers each associated with a fluorochrome identifier in the set of fluorochrome identifiers, a plurality of population identifiers each referring to a particle population, and an instrument identifier. The instructions also cause the processor to create a set of population-marker pairs by associating each population identifier in the plurality of population identifiers with a biological marker identifier from the set of biological marker identifiers, and generate a set of separability metrics each predicting a measure of statistical distance between particle populations in flow cytometer data space, where each measure of statistical distance is related to a detected signal intensity that would result from each fluorochrome associated with each population-marker pair being employed in a flow cytometric protocol using an instrument associated with the instrument identifier. In embodiments, the instructions also cause the processor to aggregate the set of separability metrics into a panel score, and evaluate said panel score to assess the suitability of the initial fluorochrome panel for use in the flow cytometric protocol. In some instances, the system is, or comprises, a flow cytometer.

Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, flash drive, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java, Python, Visual Basic, and C++, as well as many others.

Utility

Methods, systems, and computer readable media of the present invention may find use where it is desirable to automatically determine usable sets of fluorochromes for particle analysis (e.g., flow cytometry). In certain cases, the invention particularly finds use in the experimental design for full-spectrum (i.e., "spectral") flow cytometry panels. Put another way, the invention serves as a first step in spectral panel design by specifying whether a set of dyes is usable simultaneously or not. In some instances, methods, systems and computer readable media described herein aid in the determination of which set(s) of fluorochromes are likely to provide the best quality data (e.g., maximum biological resolution). The invention accomplishes the above via an automated optimization algorithm, the use of fluorochromes' spectral signatures as a readily available, easy-to-measure input to the algorithm, and the use of a spectral matrix as a computationally efficient heuristic for optimization.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include instructions and/or programmable logic for carrying out the claimed method. For example, kits include programming configured to assess and optionally optimize a fluorochrome panel (e.g., as described above in the Methods section) such as in the form of a computer readable medium (e.g., flash drive, USB storage, compact disk, DVD, Blu-ray disk, etc.) or instructions for downloading the programming from an internet web protocol or cloud server.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

The following example is offered by way of illustration and not by way of limitation.

EXPERIMENTAL

Problem Layout

A 9-color panel was sought to phenotype the subsets of CD8+ and CD4+ T cells, study the quantitative expression levels of CD27 and CD28 for those subsets, and to gate out regulatory T cell populations. The relevant markers are CD3, CD4, CD8, CCR7, CD45RA, CD27, CD28, CD25, and CD127. A BD FACSLyric™ was used as a demonstration. This instrument has 3 lasers and 12 detectors. The three lasers are violet, blue, and red lasers.

Figure 6:
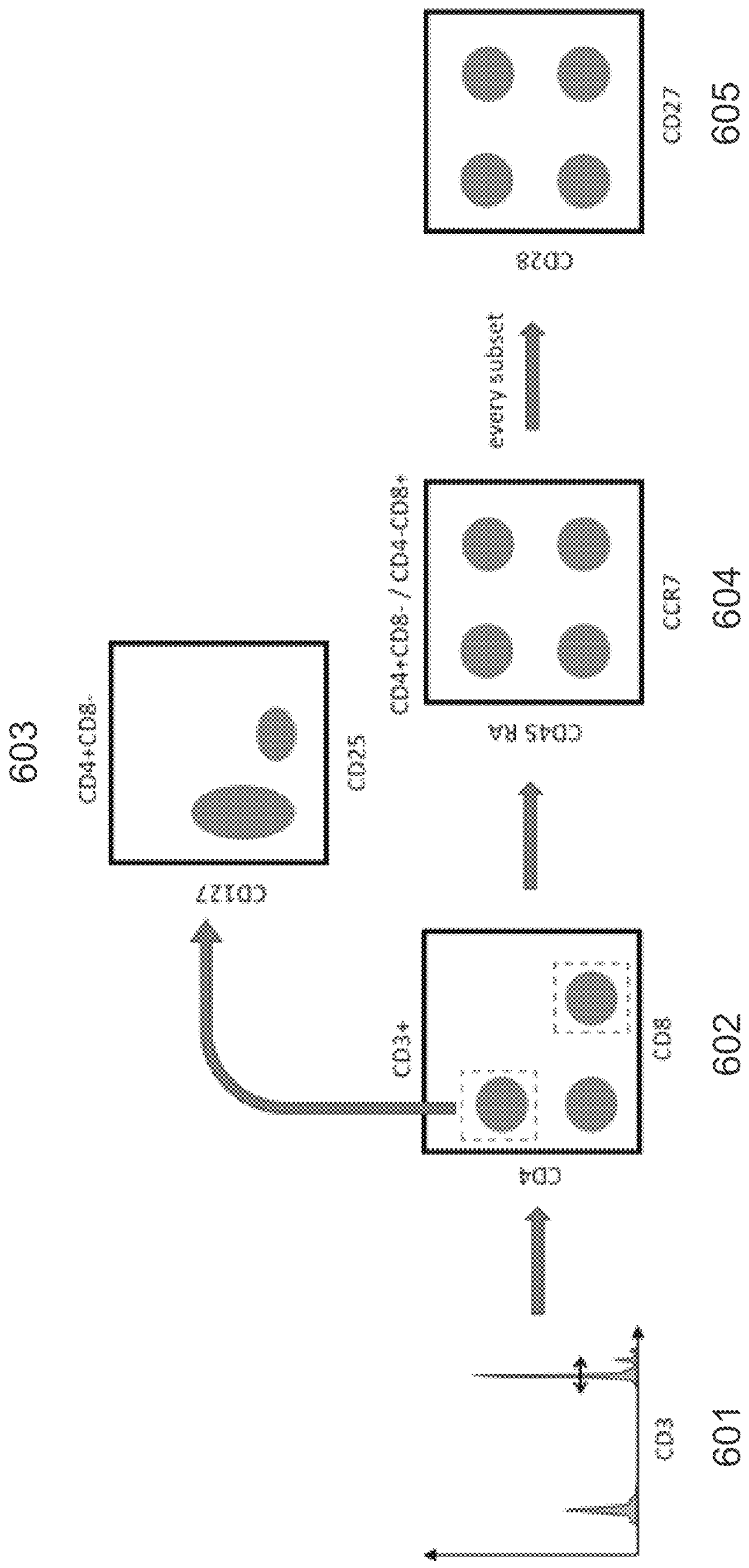
FIG. 6 depicts an exemplary gating strategy employed in the subject invention.

A gating strategy was subsequently identified. Following appropriate scattering gates, singlet lymphocytes were gated out. This gating strategy is illustrated in FIG. 6. The CD3+ population (shown in plot 601) was gated and then displayed on the CD4-CD8 bivariate scattering plot 602. For each of these populations, the expression levels of CD45RA and CCR7 were used to differentiate the naïve T cells, effector T cells, central memory T cells, and effector memory T cells (plot 604). For each of these subsets, their expression levels of CD27 and CD28 can then be studied (plot 605). For CD4+ T cells, the combination of CD25 and CD127 was used to gate out the regulatory T cells (plot 603).

The set of reagents from which the fluorochrome panel may be sought was identified. While any reagent inventory could be employed as a search space, 22 fluorochromes were selected and it was assumed that their antibody conjugations were available for all the markers of interest. In particular, the fluorochromes used in the search space were BV421, V450, BV480, PacificBlue, BV605, BV711, BV786, AF488, BB515, FITC, PE, BB700, PE-Cy5.5, PerCP-Cy5.5, BB790, PE-Cy7, APC, AF647, AF700, APC-R700, APC-Cy7 and APC-H7. The number of possible combinations for constructing a 9-color panel is on the order of 5e5 which is inadmissible for a brute force screening.

Automatic Panel Design Workflow

Most gating strategies come down to comparing the separability of two populations using one or two features. The gating strategy described above (i.e., with respect to FIG. 6) can then be broken up into a list of cell and marker pairs for which the degree of separability is to be evaluated. A partial view of such a list is presented in Table 1:

TABLE 1

A broken-up gating hierarchy

| Cell pair | Marker pair |
|---|---|
| (CD8+, double negative T cells) | (CD4, CD8) |
| (CD4+, double negative T cells) | (CD4, CD8) |
| (CD8-effector memory, CD8-Naive) | (CCR7, CD45RA) |
| . . . | . . . |

Subsequently, implicit populations were subsequently added. Although this biologic problem is only concerned with T cells, there are certainly non-T cells in the tube that get co-n stained and need to be gated out. To evaluate the separability of T cells, these non-T cells also need to be added. Essentially, any populations that are not of biological interest in this study but could potentially show up in the gating hierarchy need to be defined as well. Some examples of such implicit populations are shown in Table 2:

TABLE 2

Exemplary cell and marker pairs for implicit populations

| Cell pair | Marker pair |
|---|---|
| (non-T cell, T cells) | (CD3) |
| (non-regulatory T cells, regulatory T cells) | (CD25, CD127) |

Quantitative markers were then added. In the gating hierarchy, some markers are used to classify populations, such as CD3, CD4, and CD8. Some markers, however, are used to study their quantitative expression levels such as CD27 and CD28. It would be beneficial to distinguish these two types in the algorithm. In order to have a uniform approach to evaluating the ability of distinguishing different expression levels, pseudo-populations were defined by constructing four populations for each pair of quantitative markers (i.e., (+, +), (+, −), (−, +), and (−, −)). The separability between these four pseudo-populations could then be evaluated. In the present example, q1 (quadrant 1) was used to denote (+, +), q2 (quadrant 2) was used to denote (−, +), q3 (quadrant 3) was used to denote (−, −), and q4 (quadrant 4) was used to denote (+, −). Pseudo-populations synthesized for quantitative markers are shown in Table 3:

TABLE 3

Pseudo-populations for quantitative markers

| Cell pair | Marker pair |
|---|---|
| (CD8Eff*CD27*CD28*q2, CD8Eff) | (CD27, CD28) |
| (CD8Eff*CD27*CD28*q2, CD8Eff*CD27*CD28*q3) | (CD27, CD28) |

By doing these three steps, a holistic list (Table 4) of cell/marker pairs was obtained. This list contains the contain the biological problem and the corresponding gating hierarchy. A good panel will be such that these pairs can be well separated.

TABLE 4

Holistic list of cell/marker pairs

| | cell pair | marker pair | quantitative |
|---|---|---|---|
| 0 | {‘CD8Eff*CD27*CD28*q2’, ‘CD8Eff’} | {‘CD28’, ‘CD27’} | TRUE |
| 1 | {‘CD8Eff*CD27*CD28*q2’, ‘CD8Eff*CD27*CD28*q3’} | {‘CD28’, ‘CD27’} | TRUE |
| 2 | {‘CD8Eff*CD27*CD28*q4’, ‘CD8Eff*CD27*CD28*q3’} | {‘CD28’, ‘CD27’} | TRUE |
| 3 | {‘CD8Eff*CD27*CD28*q4’, ‘CD8Eff’} | {‘CD28’, ‘CD27’} | TRUE |
| 4 | {‘CD8Eff*CD95*PD-1*q2’, ‘CD8Eff’} | {‘CD95’, ‘PD-1’} | TRUE |
| 5 | {‘CD8Eff*CD95*PD-1*q2’, ‘CD8Eff*CD95*PD-1*q3’} | {‘CD95’, ‘PD-1’} | TRUE |
| 6 | {‘CD8Eff*CD95*PD-1*q3’, ‘CD8Eff*CD95*PD-1*q4’} | {‘CD95’, ‘PD-1’} | TRUE |
| 7 | {‘CD8Eff’, ‘CD8Eff*CD95*PD-1*q4’} | {‘CD95’, ‘PD-1’} | TRUE |
| 8 | {‘CD8Eff*CD38*HLA-DR*q2’, ‘CD8Eff’} | {‘CD38’, ‘HLA-DR’} | TRUE |
| 9 | {‘CD8Eff*CD38*HLA-DR*q3’, ‘CD8Eff*CD38*HLA-DR*q2’} | {‘CD38’, ‘HLA-DR’} | TRUE |
| 10 | {‘CD8Eff*CD38*HLA-DR*q4’, ‘CD8Eff*CD38*HLA-DR*q3’} | {‘CD38’, ‘HLA-DR’} | TRUE |
| 11 | {‘CD8Eff*CD38*HLA-DR*q4’, ‘CD8Eff’} | {‘CD38’, ‘HLA-DR’} | TRUE |
| 12 | {‘CD8Eff’, ‘CD8EM’} | {‘CCR7’, ‘CD45RA’} | FALSE |
| 13 | {‘CD8CM’, ‘CD8Eff’} | {‘CCR7’, ‘CD45RA’} | FALSE |
| 14 | {‘CD8N’, ‘CD8Eff’} | {‘CCR7’, ‘CD45RA’} | FALSE |
| 15 | {‘CD8EM*CD27*CD28*q2’, ‘CD8EM’} | {‘CD28’, ‘CD27’} | TRUE |

TABLE 4-continued

Holistic list of cell/marker pairs

| | cell pair | marker pair | quantitative |
|---|---|---|---|
| 16 | {'CD8EM*CD27*CD28*q3', 'CD8EM*CD27*CD28*q2'} | {'CD28', 'CD27'} | TRUE |
| 17 | {'CD8EM*CD27*CD28*q3', 'CD8EM*CD27*CD28*q4'} | {'CD28', 'CD27'} | TRUE |
| 18 | {'CD8EM', 'CD8EM*CD27*CD28*q4'} | {'CD28', 'CD27'} | TRUE |
| 19 | {'CD8EM*CD95*PD-1*q2', 'CD8EM'} | {'CD95', 'PD-1'} | TRUE |
| 20 | {'CD8EM*CD95*PD-1*q2', 'CD8EM*CD95*PD-1*q3'} | {'CD95', 'PD-1'} | TRUE |
| 21 | {'CD8EM*CD95*PD-1*q4', 'CD8EM*CD95*PD-1*q3'} | {'CD95', 'PD-1'} | TRUE |
| 22 | {'CD8EM*CD95*PD-1*q4', 'CD8EM'} | {'CD95', 'PD-1'} | TRUE |
| 23 | {'CD8EM*CD38*HLA-DR*q2', 'CD8EM'} | {'CD38', 'HLA-DR'} | TRUE |
| 24 | {'CD8EM*CD38*HLA-DR*q2', 'CD8EM*CD38*HLA-DR*q3'} | {'CD38', 'HLA-DR'} | TRUE |
| 25 | {'CD8EM*CD38*HLA-DR*q4', 'CD8EM*CD38*HLA-DR*q3'} | {'CD38', 'HLA-DR'} | TRUE |
| 26 | {'CD8EM*CD38*HLA-DR*q4', 'CD8EM'} | {'CD38', 'HLA-DR'} | TRUE |
| 27 | {'CD8CM', 'CD8EM'} | {'CCR7', 'CD45RA'} | FALSE |
| 28 | {'CD8N', 'CD8EM'} | {'CCR7', 'CD45RA'} | FALSE |
| 29 | {'CD8CM*CD27*CD28*q2', 'CD8CM'} | {'CD28', 'CD27'} | TRUE |
| 30 | {'CD8CM*CD27*CD28*q3', 'CD8CM*CD27*CD28*q2'} | {'CD28', 'CD27'} | TRUE |
| 31 | {'CD8CM*CD27*CD28*q3', 'CD8CM*CD27*CD28*q4'} | {'CD28', 'CD27'} | TRUE |
| 32 | {'CD8CM', 'CD8CM*CD27*CD28*q4'} | {'CD28', 'CD27'} | TRUE |
| 33 | {'CD8CM*CD95*PD-1*q2', 'CD8CM'} | {'CD95', 'PD-1'} | TRUE |
| 34 | {'CD8CM*CD95*PD-1*q2', 'CD8CM*CD95*PD-1*q3'} | {'CD95', 'PD-1'} | TRUE |
| 35 | {'CD8CM*CD95*PD-1*q4', 'CD8CM*CD95*PD-1*q3'} | {'CD95', 'PD-1'} | TRUE |
| 36 | {'CD8CM*CD95*PD-1*q4', 'CD8CM'} | {'CD95', 'PD-1'} | TRUE |
| 37 | {'CD8CM', 'CD8CM*CD38*HLA-DR*q2'} | {'CD38', 'HLA-DR'} | TRUE |
| 38 | {'CD8CM*CD38*HLA-DR*q3', 'CD8CM*CD38*HLA-DR*q2'} | {'CD38', 'HLA-DR'} | TRUE |
| 39 | {'CD8CM*CD38*HLA-DR*q3', 'CD8CM*CD38*HLA-DR*q4'} | {'CD38', 'HLA-DR'} | TRUE |
| 40 | {'CD8CM', 'CD8CM*CD38*HLA-DR*q4'} | {'CD38', 'HLA-DR'} | TRUE |
| 41 | {'CD8N', 'CD8CM'} | {'CCR7', 'CD45RA'} | FALSE |
| 42 | {'CD8N*CD27*CD28*q2', 'CD8N'} | {'CD28', 'CD27'} | TRUE |
| 43 | {'CD8N*CD27*CD28*q2', 'CD8N*CD27*CD28*q3'} | {'CD28', 'CD27'} | TRUE |
| 44 | {'CD8N*CD27*CD28*q3', 'CD8N*CD27*CD28*q4'} | {'CD28', 'CD27'} | TRUE |
| 45 | {'CD8N', 'CD8N*CD27*CD28*q4'} | {'CD28', 'CD27'} | TRUE |
| 46 | {'CD8N', 'CD8N*CD95*PD-1*q2'} | {'CD95', 'PD-1'} | TRUE |
| 47 | {'CD8N*CD95*PD-1*q3', 'CD8N*CD95*PD-1*q2'} | {'CD95', 'PD-1'} | TRUE |
| 48 | {'CD8N*CD95*PD-1*q3', 'CD8N*CD95*PD-1*q4'} | {'CD95', 'PD-1'} | TRUE |
| 49 | {'CD8N*CD95*PD-1*q4', 'CD8N'} | {'CD95', 'PD-1'} | TRUE |
| 50 | {'CD8N', 'CD8N*CD38*HLA-DR*q2'} | {'CD38', 'HLA-DR'} | TRUE |
| 51 | {'CD8N*CD38*HLA-DR*q2', 'CD8N*CD38*HLA-DR*q3'} | {'CD38', 'HLA-DR'} | TRUE |
| 52 | {'CD8N*CD38*HLA-DR*q3', 'CD8N*CD38*HLA-DR*q4'} | {'CD38', 'HLA-DR'} | TRUE |
| 53 | {'CD8N', 'CD8N*CD38*HLA-DR*q4'} | {'CD38', 'HLA-DR'} | TRUE |
| 54 | {'CD4Eff', 'CD4Eff*CD27*CD28*q2'} | {'CD28', 'CD27'} | TRUE |
| 55 | {'CD4Eff*CD27*CD28*q2', 'CD4Eff*CD27*CD28*q3'} | {'CD28', 'CD27'} | TRUE |
| 56 | {'CD4Eff*CD27*CD28*q3', 'CD4Eff*CD27*CD28*q4'} | {'CD28', 'CD27'} | TRUE |
| 57 | {'CD4Eff', 'CD4Eff*CD27*CD28*q4'} | {'CD28', 'CD27'} | TRUE |
| 58 | {'CD4Eff', 'CD4Eff*CD95*PD-1*q2'} | {'CD95', 'PD-1'} | TRUE |
| 59 | {'CD4Eff*CD95*PD-1*q2', 'CD4Eff*CD95*PD-1*q3'} | {'CD95', 'PD-1'} | TRUE |
| 60 | {'CD4Eff*CD95*PD-1*q4', 'CD4Eff*CD95*PD-1*q3'} | {'CD95', 'PD-1'} | TRUE |

TABLE 4-continued

Holistic list of cell/marker pairs

| | cell pair | marker pair | quantitative |
|---|---|---|---|
| 61 | {‘CD4Eff’, ‘CD4Eff*CD95*PD-1*q4’} | {‘CD95’, ‘PD-1’} | TRUE |
| 62 | [‘CD4Eff’, ‘CD4Eff*CD38*HLA-DR*q2’} | {‘CD38’, ‘HLA-DR’} | TRUE |
| 63 | [‘CD4Eff*CD38*HLA-DR*q3’, ‘CD4Eff*CD38*HLA-DR*q2’} | {‘CD38’, ‘HLA-DR’] | TRUE |
| 64 | {‘CD4Eff*CD38*HLA-DR*q4’, ‘CD4Eff*CD38*HLA-DR*q3’} | {‘CD38’, ‘HLA-DR’} | TRUE |
| 65 | {‘CD4Eff’, ‘CD4Eff*CD38*HLA-DR*q4’} | {‘CD38’, ‘HLA-DR’] | TRUE |
| 66 | {‘CD4Eff’, ‘CD4EM’} | {‘CCR7’, ‘CD45RA’} | FALSE |
| 67 | {‘CD4Eff’, ‘CD4CM’} | {‘CCR7’, ‘CD45RA’} | FALSE |
| 68 | {‘CD4Eff’, ‘CD4N’} | {‘CCR7’, ‘CD45RA’} | FALSE |
| 69 | {‘CD4EM*CD27*CD28*q2’, ‘CD4EM’} | {‘CD28’, ‘CD27’} | TRUE |
| 70 | {‘CD4EM*CD27*CD28*q2’, ‘CD4EM*CD27*CD28*q3’} | {‘CD28’, ‘CD27’} | TRUE |
| 71 | {‘CD4EM*CD27*CD28*q3’, ‘CD4EM*CD27*CD28*q4’} | {‘CD28’, ‘CD27’} | TRUE |
| 72 | {‘CD4EM’, ‘CD4EM*CD27*CD28*q4’} | {‘CD28’, ‘CD27’} | TRUE |
| 73 | {‘CD4EM*CD95*PD-1*q2’, ‘CD4EM’} | {‘CD95’, ‘PD-1’} | TRUE |
| 74 | {‘CD4EM*CD95*PD-1*q3’, ‘CD4EM*CD95*PD-1*q2’} | {‘CD95’, ‘PD-1’} | TRUE |
| 75 | {‘CD4EM*CD95*PD-1*q3’, ‘CD4EM*CD95*PD-1*q4’} | {‘CD95’, ‘PD-1’} | TRUE |
| 76 | {‘CD4EM’, ‘CD4EM*CD95*PD-1*q4’} | {‘CD95’, ‘PD-1’} | TRUE |
| 77 | {‘CD4EM*CD38*HLA-DR*q2’, ‘CD4EM’} | {‘CD38’, ‘HLA-DR’} | TRUE |
| 78 | {‘CD4EM*CD38*HLA-DR*q2’, ‘CD4EM*CD38*HLA-DR*q3’} | {‘CD38’, ‘HLA-DR’} | TRUE |
| 79 | {‘CD4EM*CD38*HLA-DR*q4’, ‘CD4EM*CD38*HLA-DR*q3’} | {‘CD38’, ‘HLA-DR’} | TRUE |
| 80 | {‘CD4EM*CD38*HLA-DR*q4’, ‘CD4EM’} | {‘CD38’, ‘HLA-DR’} | TRUE |
| 81 | {‘CD4CM’, ‘CD4EM’} | {‘CCR7’, ‘CD45RA’} | FALSE |
| 82 | {‘CD4N’, ‘CD4EM’} | {‘CCR7’, ‘CD45RA’} | FALSE |
| 83 | {‘CD4CM’, ‘CD4CM*CD27*CD28*q2’} | {‘CD28’, ‘CD27’} | TRUE |
| 84 | {‘CD4CM*CD27*CD28*q3’, ‘CD4CM*CD27*CD28*q2’} | {‘CD28’, ‘CD27’} | TRUE |
| 85 | {‘CD4CM*CD27*CD28*q4’, ‘CD4CM*CD27*CD28*q3’} | {‘CD28’, ‘CD27’} | TRUE |
| 86 | {‘CD4CM’, ‘CD4CM*CD27*CD28*q4’} | {‘CD28’, ‘CD27’} | TRUE |
| 87 | {‘CD4CM*CD95*PD-1*q2’, ‘CD4CM’} | {‘CD95’, ‘PD-1’} | TRUE |
| 88 | {‘CD4CM*CD95*PD-1*q2’, ‘CD4CM*CD95*PD-1*q3’} | {‘CD95’, ‘PD-1’} | TRUE |
| 89 | {‘CD4CM*CD95*PD-1*q4’, ‘CD4CM*CD95*PD-1*q3’} | {‘CD95’, ‘PD-1’} | TRUE |
| 90 | {‘CD4CM*CD95*PD-1*q4’, ‘CD4CM’} | {‘CD95’, ‘PD-1’} | TRUE |
| 91 | {‘CD4CM’, ‘CD4CM*CD38*HLA-DR*q2’} | {‘CD38’, ‘HLA-DR’} | TRUE |
| 92 | {‘CD4CM*CD38*HLA-DR*q2’, ‘CD4CM*CD38*HLA-DR*q3’} | {‘CD38’, ‘HLA-DR’} | TRUE |
| 93 | {‘CD4CM*CD38*HLA-DR*q4’, ‘CD4CM*CD38*HLA-DR*q3’} | {‘CD38’, ‘HLA-DR’} | TRUE |
| 94 | {‘CD4CM’, ‘CD4CM*CD38*HLA-DR*q4’} | {‘CD38’, ‘HLA-DR’} | TRUE |
| 95 | {‘CD4CM’, ‘CD4N’} | {‘CCR7’, ‘CD45RA’} | FALSE |
| 96 | {‘CD4N*CD27*CD28*q2’, ‘CD4N’} | {‘CD28’, ‘CD27’} | TRUE |
| 97 | {‘CD4N*CD27*CD28*q2’, ‘CD4N*CD27*CD28*q3’} | {‘CD28’, ‘CD27’} | TRUE |
| 98 | {‘CD4N*CD27*CD28*q3’, ‘CD4N*CD27*CD28*q4’} | {‘CD28’, ‘CD27’} | TRUE |
| 99 | {‘CD4N*CD27*CD28*q4’, ‘CD4N’} | {‘CD28’, ‘CD27’} | TRUE |
| 100 | {‘CD4N*CD95*PD-1*q2’, ‘CD4N’} | {‘CD95’, ‘PD-1’} | TRUE |
| 101 | {‘CD4N*CD95*PD-1*q2’, ‘CD4N*CD95*PD-1*q3’} | {‘CD95’, ‘PD-1’} | TRUE |
| 102 | {‘CD4N*CD95*PD-1*q3’, ‘CD4N*CD95*PD-1*q4’} | {‘CD95’, ‘PD-1’} | TRUE |
| 103 | {‘CD4N’, ‘CD4N*CD95*PD-1*q4’} | {‘CD95’, ‘PD-1’} | TRUE |

TABLE 4-continued

| Holistic list of cell/marker pairs | | | |
|---|---|---|---|
| | cell pair | marker pair | quantitative |
| 104 | {'CD4N*CD38*HLA-DR*q2', 'CD4N'} | {'CD38', 'HLA-DR'} | TRUE |
| 105 | {'CD4N*CD38*HLA-DR*q3', 'CD4N*CD38*HLA-DR*q2'} | {'CD38', 'HLA-DR'} | TRUE |
| 106 | {'CD4N*CD38*HLA-DR*q4', 'CD4N*CD38*HLA-DR*q3'} | {'CD38', 'HLA-DR'} | TRUE |
| 107 | {'CD4N*CD38*HLA-DR*q4', 'CD4N'} | {'CD38', 'HLA-DR'] | TRUE |
| 108 | {'Treg', 'Treg*CD45RA*HLA-DR*q2'} | {'HLA-DR', 'CD45RA'} | TRUE |
| 109 | {'Treg*CD45RA*HLA-DR*q3', 'Treg*CD45RA*HLA-DR*q2'} | {'HLA-DR', 'CD45RA'} | TRUE |
| 110 | {'Treg*CD45RA*HLA-DR*q3', 'Treg*CD45RA*HLA-DR*q4'} | {'HLA-DR', 'CD45RA'} | TRUE |
| 111 | {'Treg', 'Treg*CD45RA*HLA-DR*q4'} | {'HLA-DR', 'CD45RA'} | TRUE |
| 112 | {'Treg', 'Treg*CD27*CD38*q2'} | {'CD38', 'CD27'} | TRUE |
| 113 | {'Treg*CD27*CD38*q3', 'Treg*CD27*CD38*q2'} | {'CD38', 'CD27'} | TRUE |
| 114 | {'Treg*CD27*CD38*q3', 'Treg*CD27*CD38*q4'} | {'CD38', 'CD27'} | TRUE |
| 115 | {'Treg*CD27*CD38*q4', 'Treg'} | {'CD38', 'CD27'} | TRUE |
| 116 | {'TCRgd+', 'CD8Eff'} | {'TCRgd', 'CD3'} | FALSE |
| 117 | {'TCRgd+', 'CD8EM'} | {'TCRgd', 'CD3'} | FALSE |
| 118 | {'TCRgd+', 'CD8CM'} | {'TCRgd', 'CD3'} | FALSE |
| 119 | {'CD8N', 'TCRgd+'} | {'TCRgd', 'CD3'} | FALSE |
| 120 | {'CD4Eff', 'TCRgd+'} | {'TCRgd', 'CD3'} | FALSE |
| 121 | {'TCRgd+', 'CD4EM'} | {'TCRgd', 'CD3'} | FALSE |
| 122 | {'CD4CM', 'TCRgd+'} | {'TCRgd', 'CD3'} | FALSE |
| 123 | {'TCRgd+', 'CD4N'} | {'TCRgd', 'CD3'} | FALSE |
| 124 | {'Treg', 'TCRgd+'} | {'TCRgd', 'CD3'} | FALSE |
| 125 | {'Treg', 'Non-Treg1'} | {'CD127', 'CD25'} | FALSE |
| 126 | {'Treg', 'Non-Treg2'} | {'CD127', 'CD25'} | FALSE |
| 127 | {'CD8Eff', 'CD4T'} | {'CD8', 'CD4'} | FALSE |
| 128 | {'CD8EM', 'CD4T'} | {'CD8', 'CD4'} | FALSE |
| 129 | {'CD8CM', 'CD4T'} | {'CD8', 'CD4'} | FALSE |
| 130 | {'CD8N', 'CD4T'} | {'CD8', 'CD4'} | FALSE |
| 131 | {'CD4Eff', 'CD8T'} | {'CD8', 'CD4'} | FALSE |
| 132 | {'CD8T', 'CD4EM'} | {'CD8', 'CD4'} | FALSE |
| 133 | {'CD8T', 'CD4CM'} | {'CD8', 'CD4'} | FALSE |
| 134 | {'CD8T', 'CD4N'} | {'CD8', 'CD4'} | FALSE |
| 135 | {'CD8T', 'Treg'} | {'CD8', 'CD4'} | FALSE |
| 136 | {'T-dn', 'CD8Eff'} | {'CD8', 'CD4'} | FALSE |
| 137 | {'T-dn', 'CD8EM'} | {'CD8', 'CD4'} | FALSE |
| 138 | {'CD8CM', 'T-dn'} | {'CD8', 'CD4'} | FALSE |
| 139 | {'CD8N', 'T-dn'} | {'CD8', 'CD4'} | FALSE |
| 140 | {'CD4Eff', 'T-dn'} | {'CD8', 'CD4'} | FALSE |
| 141 | {'T-dn', 'CD4EM'} | {'CD8', 'CD4'} | FALSE |
| 142 | {'CD4CM', 'T-dn'} | {'CD8', 'CD4'} | FALSE |
| 143 | {'T-dn', 'CD4N'} | {'CD8', 'CD4'} | FALSE |
| 144 | {'Treg', 'T-dn'} | {'CD8', 'CD4'} | FALSE |
| 145 | {'Non-T', 'CD8Eff'} | {'CD3'} | FALSE |
| 146 | {'Non-T', 'CD8EM'} | {'CD3'} | FALSE |
| 147 | {'CD8CM', 'Non-T'} | {'CD3'} | FALSE |
| 148 | {'CD8N', 'Non-T'} | {'CD3'} | FALSE |
| 149 | {'CD4Eff', 'Non-T'} | {'CD3'} | FALSE |
| 150 | {'Non-T', 'CD4EM'} | {'CD3'} | FALSE |
| 151 | {'CD4CM', 'Non-T'} | {'CD3'} | FALSE |
| 152 | {'Non-T', 'CD4N'} | {'CD3'} | FALSE |
| 153 | {'Treg', 'Non-T'} | {'CD3'} | FALSE |

Statistical moments for different markers were then determined. In its essence, a flow cytometer can be regarded as performing a linear transformation which transforms the vector of fluorophore abundance into a vector of detector signal. Based on this model and by incorporating different noise sources into this transformation (such as Poisson noise, baseline noise, and system noise), the means and variance-covariance matrix of detector signals can be predicted. Next, the variance-covariance matrix in the detector space can be back propagated to the variance-covariance matrix of fluorophore abundance through the process of unmixing or compensation.

As an example, Poisson noise, a baseline noise of 30 statistical photoelectron (spe) for each detector, and a system coefficient of variation (cv) of 0.03 for each detector were included into the model. Given a panel listed in Table 5, the means and variance of detector signals were predicted for each population all in photon units.

TABLE 5

| Exemplary fluorochrome panel | | | | | | | | | |
|---|---|---|---|---|---|---|---|---|---|
| | 0 | 1 | 2 | 3 | 4 | 5 | 6 | 7 | 8 |
| Fluorochrome | PE | BV421 | APC-R700 | BV605 | PE-Cy7 | BV711 | FITC | BV786 | APC-Cy7 |
| Marker | CD3 | CD4 | CD8 | CCR7 | CD45RA | CD25 | CD127 | CD27 | CD28 |

The variance of each detector for selected cell populations was calculated and listed in Table 6:

TABLE 6

| Variance of signal in each detector for three populations (units: squared photon numbers) | | | | | | | | | | | | |
|---|---|---|---|---|---|---|---|---|---|---|---|---|
| Detectors | BV421 | BV480 | BV605 | BV711 | BV786 | BB515 | BB585 | BB700 | BB790 | APC | Alexa700 | APC-Cy7 |
| CD8N | 5.19 + 06 | 1.16e+05 | 5.52e+08 | 1.16e+08 | 8.07e+07 | 6.23e+07 | 5.11e+10 | 1.30e+08 | 2.03e+08 | 6.27e+08 | 4.73e+10 | 2.95e+09 |
| CD4N | 2.23e+14 | 3.57e+12 | 1.87e+09 | 2.38e+08 | 3.52e+08 | 7.02e+07 | 5.11e+10 | 7.11e+07 | 1.96e+08 | 1.95e+06 | 7.47e+05 | 2.38e+08 |
| Treg | 2.23e+14 | 3.57e+12 | 1.87e+09 | 8.21e+08 | 4.80e+086 | 4.48e+06 | 5.05e+10 | 7.66e+07 | 1.96e+08 | 1.22e+05 | 4.32e+06 | 1.58e+07 |

The back-propagated variance of fluorophore abundance was calculated as shown in Table 7:

TABLE 7

| Variance of each marker for three populations (units: squared molecule numbers) | | | | | | | | | |
|---|---|---|---|---|---|---|---|---|---|
| Markers | CD3::PE | CD4:: BV421 | CD8:: APC-R700 | CCR7:: BV605 | CD45RA:: PE-Cy7 | CD25:: BV711 | CD127:: FITC | CD27:: BV786 | CD28:: APC-Cy7 |
| CD8N | 92386.15 | 4.41e−01 | 9.78e+06 | 1411.86 | 128685.77 | 928.41 | 1488.11 | 4464.39 | 2.92e+06 |
| CD4N | 292445.32 | 8.73e+06 | 1.95e+03 | 5609.06 | 126722.18 | 2282.42 | 1676.31 | 31648.41 | 1.63e+05 |
| Treg | 91287.80 | 8.73e+06 | 4.88e+03 | 5607.26 | 126110.30 | 5333.79 | 164.21 | 39087.62 | 2.02e+04 |

It is clear from Table 7 that the variance of the same marker across different populations has a large variation. To facilitate the subsequent separability evaluation, a variance stabilization procedure should be run to stabilize these variances.

In this example, a transformation based on the inverse hyperbolic sine function with one parameter (arcsinh(x/c)) was used. An optimization routine was run so that an optimal value is found for the parameter c to minimize heteroscedasticity of a marker across different populations. The variance stabilized fluorophore variance is listed in Table 8:

Given the processed statistical moments of different markers on different populations, the statistical distance between pairs defined in the gating hierarchy could be calculated. In this example, for one dimensional histogram such as the CD3 gating step, the earth mover distance (EMD) between two distributions was calculated. For the two-dimensional scattering plot such as the CD4-CD8 bivariate plot, two distributions will be first projected to the direction where they are most separated and then EMD between projected distributions is calculated. An example list of separability scores is shown in Table 9:

TABLE 8

| Variance of each marker for three populations after automatic scaling. | | | | | | | | | |
|---|---|---|---|---|---|---|---|---|---|
| Markers | CD3::PE | CD4:: BV421 | CD8:: APC-R700 | CCR7:: BV605 | CD45RA:: PE-Cy7 | CD25:: BV711 | CD127:: FITC | CD27:: BV786 | CD28:: APC-Cy7 |
| CD8N | 9.19e−04 | 1.94e−03 | 9.78e−04 | 9.94e−04 | 1.21e−03 | 3.24e−03 | 1.33e−03 | 1.70e−03 | 1.46e−02 |
| CD4N | 9.19e−04 | 8.73e−04 | 4.42e−04 | 3.95e−03 | 1.20e−03 | 7.96e−03 | 1.50 − 03 | 1.21e−02 | 8.14e−04 |
| Treg | 9.08e−04 | 8.73e−04 | 1.10e−03 | 3.95e−03 | 1.19e−03 | 4.15e−03 | 1.40e−03 | 1.49e−02 | 2.02e−04 |

TABLE 9

| | cell pair | marker pair | quantitative | score |
|---|---|---|---|---|
| Exemplary list of separability scores | | | | |
| 0 | {CD8Eff*CD27*CD28*q2, CD8Eff} | {CD27, CD28} | True | 244.90 |
| 1 | {CD8Eff*CD27*CD28*q3, CD8Eff*CD27*CD28*q2} | {CD27, CD28} | True | 21.56 |
| 2 | {CD8Eff*CD27*CD28*q3, CD8Eff*CD27*CD28*q4} | {CD27, CD28} | True | 285.12 |
| 3 | {CD8Eff*CD27*CD28*q4, CD8Eff} | {CD27, CD28} | True | 21.43 |
| 4 | {C8EM, CD8Eff} | {CCR7, CD45RA} | False | 1966.55 |

The separability score defined above in Table 9 is a dimensionless quantity that describes the degree of separation between two univariate or bivariate distributions. Therefore, an absolute threshold can be defined to give a binary classification regarding if a certain pair is separable or not. A value of 16 was found to be a good threshold number and was used in this example. As such, the panel score is used as an objective function to be minimized in a combinatorial optimization routine. With all the above steps in place, the algorithm identified a panel with zero number of inseparable pairs as listed in Table 5.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or U.S.C. § 112(6) is not invoked.

What is claimed is:

1. A method of assessing the suitability of a fluorochrome panel for use in a flow cytometric protocol analyzing a biological sample, the method comprising, with a processor:

receiving:

an initial fluorochrome panel comprising a set of fluorochrome identifiers each referring to a fluorochrome in a set of fluorochromes, and a set of biological marker identifiers each associated with a fluorochrome identifier in the set of fluorochrome identifiers;

a plurality of population identifiers each referring to a particle population; and an instrument identifier;

creating a set of population-marker pairs by associating each population identifier in the plurality of population identifiers with a biological marker identifier from the set of biological marker identifiers;

generating a set of separability metrics each predicting a measure of statistical distance between particle populations in flow cytometer data space, wherein each measure of statistical distance is related to a detected signal intensity that would result from each fluorochrome associated with each population-marker pair being employed in a flow cytometric protocol using an instrument associated with the instrument identifier;

aggregating the set of separability metrics into a panel score; and evaluating the panel score to assess the suitability of the initial fluorochrome panel for use in the flow cytometric protocol.

2. The method according to claim 1, wherein creating the set of population-marker pairs comprises creating a population-marker pair for an implicit particle population that is not referred to in the received plurality of population identifiers but is present in the biological sample.

3. The method according to claim 1, wherein creating the set of population-marker pairs further comprises defining one or more quantitative pairs of biological marker identifiers for evaluating the quantitative expression of a particle population.

4. The method according to claim 3, further comprising separately aggregating a set of separability metrics for each of the population-marker pairs and the quantitative pairs.

5. The method according to claim 4, wherein determining the panel score comprises calculating a vector of the aggregated set of separability metrics for the population-marker pairs and the aggregated set of separability metrics for the quantitative pairs.

6. The method according to claim 1, wherein generating the set of separability metrics comprises predicting a statistical moment for each biological marker identifier in the set of biological marker identifiers based on the detected signal intensities.

7. The method according to claim 6, wherein predicting the statistical moment comprises running a Monte Carlo simulation.

8. The method according to claim 6, wherein predicting the statistical moment for each biological marker identifier in the set of biological marker identifiers comprises incorporating the effects of a noise model in the detected signal intensities.

9. The method according to claim 8, wherein incorporating the effects of the noise model in the detected signal intensities comprises obtaining an analytical formula that relates the predicted statistical moments to the noise model.

10. The method according to claim 9, further comprising incorporating the effects of the noise model in the detected signal intensities based on a spillover spreading matrix (SSM).

11. The method according to claim 1, wherein generating the set of separability metrics comprises stabilizing the variances of the detected signal intensities.

12. The method according to claim 1, wherein aggregating the set of separability metrics into a panel score comprises negating the value of the lowest separability score.

13. The method according to claim 1, wherein aggregating the set of separability metrics comprises comparing each separability metric to a threshold value.

14. The method according to claim 1, further comprising generating an optimized fluorochrome panel based on the assessment of the suitability of the initial fluorochrome panel for use in the flow cytometric protocol.

15. The method according to claim 14, wherein generating the optimized fluorochrome panel comprises determining a fluorochrome panel having an optimized panel number.

16. The method according to claim 14, wherein generating the optimized fluorochrome panel comprises adjusting the fluorochromes in the initial fluorochrome panel and assessing the suitability of the adjusted fluorochrome panel for use in the flow cytometric protocol.

17. The method according to claim 16, wherein generating the optimized fluorochrome panel comprises iteratively adjusting the initial fluorochrome panel and assessing the suitability of each iteratively adjusted fluorochrome panel for use in the flow cytometric protocol.

18. The method according to claim 1, further comprising:

receiving a gating strategy; and determining the initial fluorochrome panel based on the gating strategy.

19. The method according to claim 1, wherein the initial fluorochrome panel is randomly determined.

20. The method according to claim 1, further comprising determining the initial fluorochrome panel using the processor.

* * * * *